US011789859B1

(12) United States Patent
Xu et al.

(10) Patent No.: US 11,789,859 B1
(45) Date of Patent: Oct. 17, 2023

(54) ADDRESS GENERATION FOR PAGE COLLISION PREVENTION

(71) Applicant: Amazon Technologies, Inc., Seattle, WA (US)

(72) Inventors: Kun Xu, Austin, TX (US); Suresh Hariharan, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/449,579

(22) Filed: Sep. 30, 2021

(51) Int. Cl.
    G06F 12/02       (2006.01)
    G06F 12/0855     (2016.01)
    G06N 3/063       (2023.01)
    G06F 15/173      (2006.01)
    G06F 12/1081     (2016.01)

(52) U.S. Cl.
    CPC ...... *G06F 12/0238* (2013.01); *G06F 12/0857* (2013.01); *G06F 12/1081* (2013.01); *G06F 15/17375* (2013.01); *G06N 3/063* (2013.01)

(58) Field of Classification Search
    CPC ............ G06F 12/0238; G06F 12/0857; G06F 12/1081; G06F 12/17375; G06N 3/063
    See application file for complete search history.

(56) References Cited

U.S. PATENT DOCUMENTS

| 5,935,229 | A | * | 8/1999 | Duval | G06F 13/12 370/452 |
|---|---|---|---|---|---|
| 2012/0300787 | A1 | | 11/2012 | Korger | |
| 2013/0007712 | A1 | | 1/2013 | Agarwal et al. | |
| 2017/0286329 | A1 | * | 10/2017 | Fernando | G06F 12/0813 |
| 2018/0157606 | A1 | * | 6/2018 | Schroder | G06F 12/109 |

OTHER PUBLICATIONS

U.S. Appl. No. 17/449,580, filed Sep. 30, 2021, Hariharan et al.
U.S. Notice of Allowance dated Apr. 19, 2023 in U.S. Appl. No. 17/449,580.
U.S. Non-Final Office Action dated Dec. 22, 2022 in U.S. Appl. No. 17/449,580.

* cited by examiner

*Primary Examiner* — Aracelis Ruiz
(74) *Attorney, Agent, or Firm* — Weaver Austin Villeneuve & Sampson LLP

(57) ABSTRACT

To generate sequential addresses when multiple integrated circuit (IC) devices are accessing the same memory, an address token is sent along the IC devices communicatively coupled in a ring topology. The address token is first transferred along the ring topology during a memory reservation phase in which each IC device can set a corresponding memory request bit to indicate that the IC device has data to write to the memory. The modified address token is then transferred along the ring topology again during a memory access phase. During the memory access phase, each IC device that has data to write can perform a memory write operation using a sequential address determined from the contents of the address token.

18 Claims, 13 Drawing Sheets

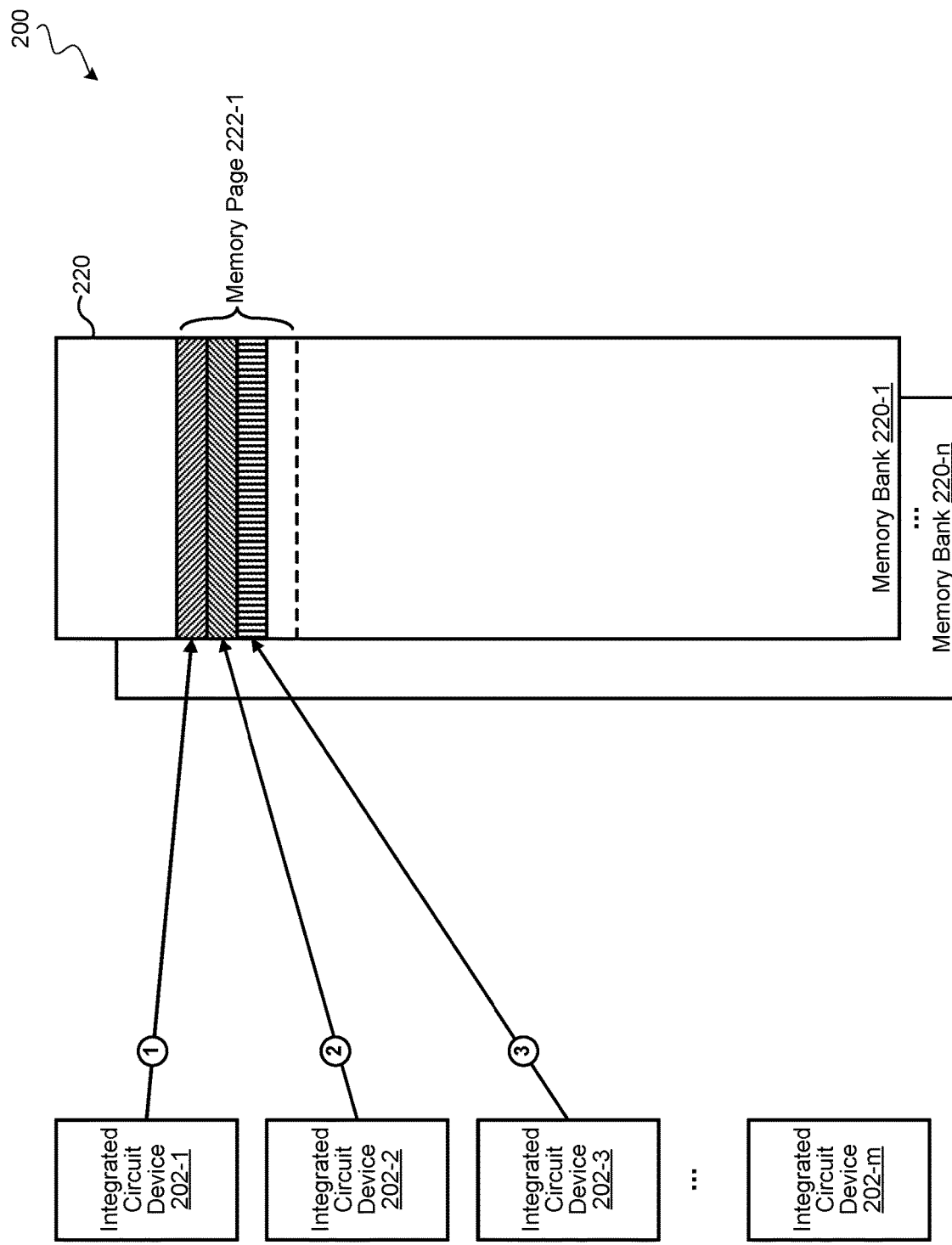

US 11,789,859 B1

ADDRESS GENERATION FOR PAGE COLLISION PREVENTION

BACKGROUND

Complex computing systems such as those used for implementing neural networks may include multiple processing units sharing the same memory. For example, a computing system may include multiple accelerators that read and write data to a memory. Such data may include data used for computations (e.g., weights, feature maps, partial sums, etc.), as well as data used for performance monitoring, debug, and/or other support tasks. To improve latency and throughput, the data transfers between an accelerator and memory can be performed using direct memory access (DMA) to limit the involvement of a host processor. Multiple DMA engines can be implemented in a computing system. For example, a computing system may implement any number of DMA engines such as eight to thirty-two DMA engines, with each DMA engine capable of independently writing to the shared memory.

BRIEF DESCRIPTION OF THE DRAWINGS

Various embodiments in accordance with the present disclosure will be described with reference to the drawings, in which:

FIG. 2A illustrates a block diagram of an example of a computing system accessing the same memory page;

DETAILED DESCRIPTION

Accesses to dynamic random access memory (DRAM) may incur different latencies depending on the status of the memory page that the access is directed to. For example, different latencies may incur depending on whether the access is made to an already opened page (e.g., a page hit), when no pages are opened, or to a page different than an already opened page (e.g., page collision). Of these scenarios, the shortest latency occurs when there is a page hit, and the longest latency occurs when there is a page collision because the opened page has to be closed before opening the page being accessed.

A memory device such as high-bandwidth memory (HBM) may include multiple banks of memory to support high throughput. For example, HBM may provide thirty-two banks of dynamic rand access memory (DRAM) per pseudo-channel. This allows thirty-two pages (one page per bank) to be opened concurrently. Such an architecture can provide low-latency accesses for up to thirty-two different access streams by staggering the accesses to the different banks in a pipeline fashion with each bank being allocated to a different stream. However, increasing the number of access streams beyond the number of memory banks in the system may increase the chances of encountering page collisions, because the likelihood of having closely spaced accesses to different pages of the same bank is greater. This may cause unwanted access latencies resulting in a reduction in performance and throughput.

To avoid page collision when there are multiple components such as multiple DMA engines accessing a common memory, the techniques disclosed herein provide a communication scheme for the multiple components to share their memory access requests with each other such that the memory can be accessed using sequential addresses. The different components can be communicatively coupled in a ring topology to allow an address token to be passed from one component to the next. As each component receives the address token, the component can update the address token with the component's memory access requests such that subsequent components along the ring topology can determine which address to use to avoid page collision. In some implementations, the page collision prevention techniques can be applied to multiple memory regions such that different access streams can be directed to different memory regions while providing sequential addresses for accesses within the same memory region.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

Figure 1:
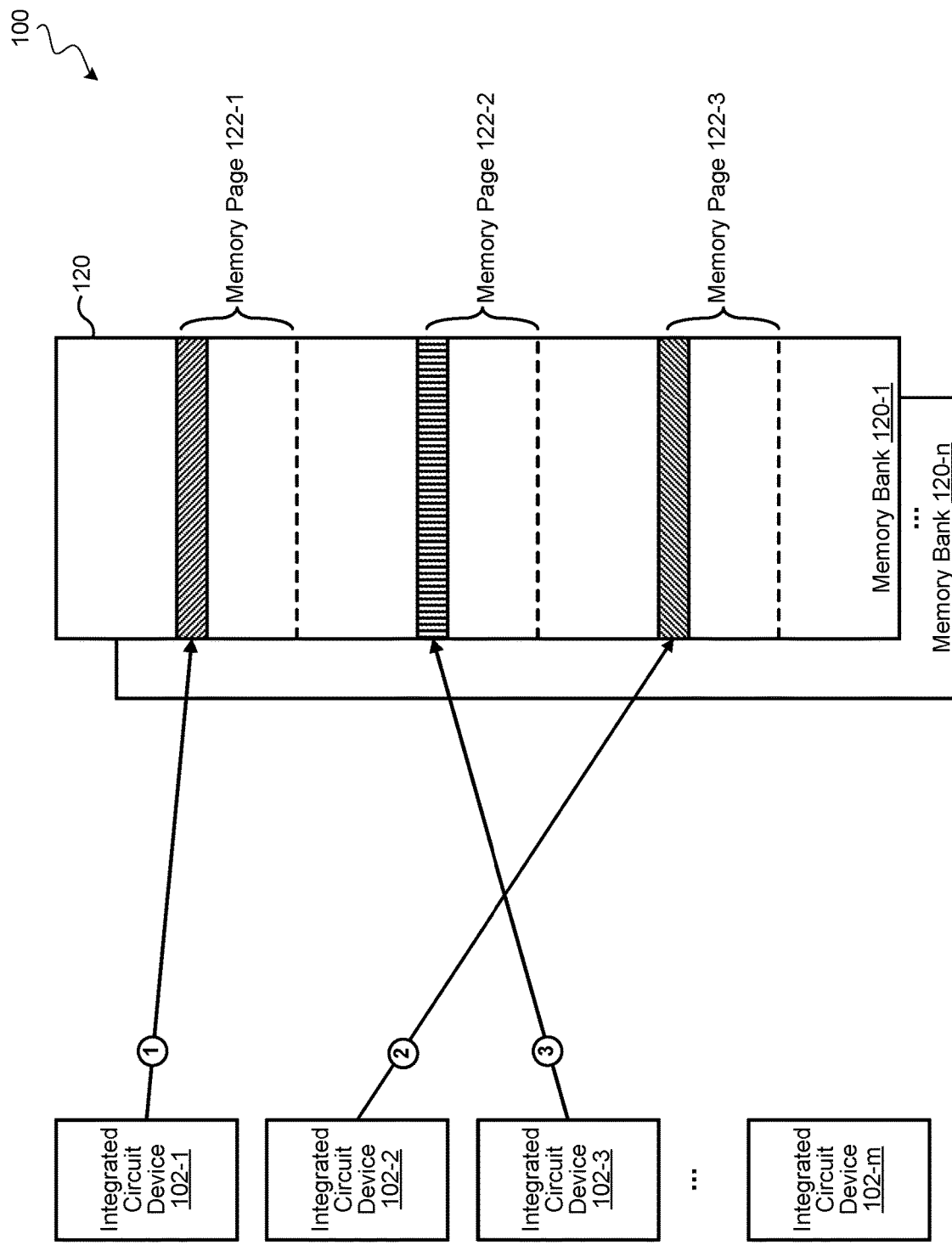
FIG. 1 illustrates a block diagram of an example of a computing system accessing different memory pages.

FIG. 1 illustrates an example of a computing system 100. Computing system 100 includes a memory 120 that is accessed by multiple components such as integrated circuit devices 102-1 to 102-*m*. In some implementations, computing system 100 can be a host system having one or more accelerators to perform neural network operations. Memory 120 can be a high-bandwidth memory (HBM) implemented with multiple banks of DRAM 120-1 to 120-*n*. Integrated circuit devices 120-1 to 102-*m* can include, for example, DMA engines that facilitate memory accesses between the accelerators and memory 120. In some implementations, each DMA engine can be allocated for an accelerator and can be responsible for performing memory accesses for multiple access streams associated with the accelerator. For example, the multiple access streams may include one or more data streams for reading and writing computational data (e.g., weights, feature maps, partial sums, etc.), and one or more access streams for reading and writing data for support tasks such as performance monitoring data, debug data, etc. Access streams that are used for support tasks can be referred to as notification queues. In some implementations, integrated circuit devices 120-1 to 102-*m* can also include different types of integrated circuit devices such as the accelerators themselves and/or other components or functional blocks (e.g., secondary processors, network interface controller, etc.) of the computing system that can access memory 120.

Page collisions can occur when sequential accesses are made to different pages of the same bank. For example, a memory access sequence may involve integrated circuit device 102-1 performing a first write operation to memory page 122-1 of memory bank 120-1, followed by integrated circuit device 102-2 performing a second write operation to memory page 122-2 of memory bank 120-1, and then integrated circuit device 102-3 performing a third write to memory page 122-3 of memory bank 120-1. Such a memory access sequence may incur high latencies because memory page 122-1 has to be closed before memory page 122-2 can be opened, and memory page 122-2 has to be closed before memory page 122-3 can be opened.

FIG. 2A illustrates another example of a computing system 200 that uses an alternative memory access sequence to avoid page collision. Computing system 200 may include a memory 220 implemented using multiple memory banks 220-1 to 220-n, and multiple integrated circuit devices 202-1 to 202-m that can access memory 220. The components of computing system 200 can be similar to those of computing system 100, and hence a detailed description of which need not be repeated.

As shown in FIG. 2A, an alternative memory access sequence may involve integrated circuit device 202-1 performing a first write operation to memory page 222-1 of memory bank 220-1, followed by integrated circuit device 202-2 performing a second write operation to memory page 222-2 of memory bank 220-1, and then integrated circuit device 202-3 performing a third write operation to memory page 222-1 of memory bank 220-1. Because all three sequential write operations are performed using sequential addresses directed to the same memory page 222-1, the access latencies associated with closing a memory page can be eliminated. Once opened by the first write operation, memory page 222-1 can remain open for the subsequent write operations to reduce the overall latency and increase the overall throughput.

To implement such a memory access sequence to avoid page collision, integrated circuit device 202-2 may need information as to which address was written by integrated circuit device 202-1 such that the write operation performed by integrated circuit device 202-2 can be directed to the next sequential address. Similarly, integrated circuit device 202-3 may need information as to which address was written by integrated circuit device 202-2 such that the write operation performed by integrated circuit device 202-3 can be directed to the next sequential address.

Figure 2B:
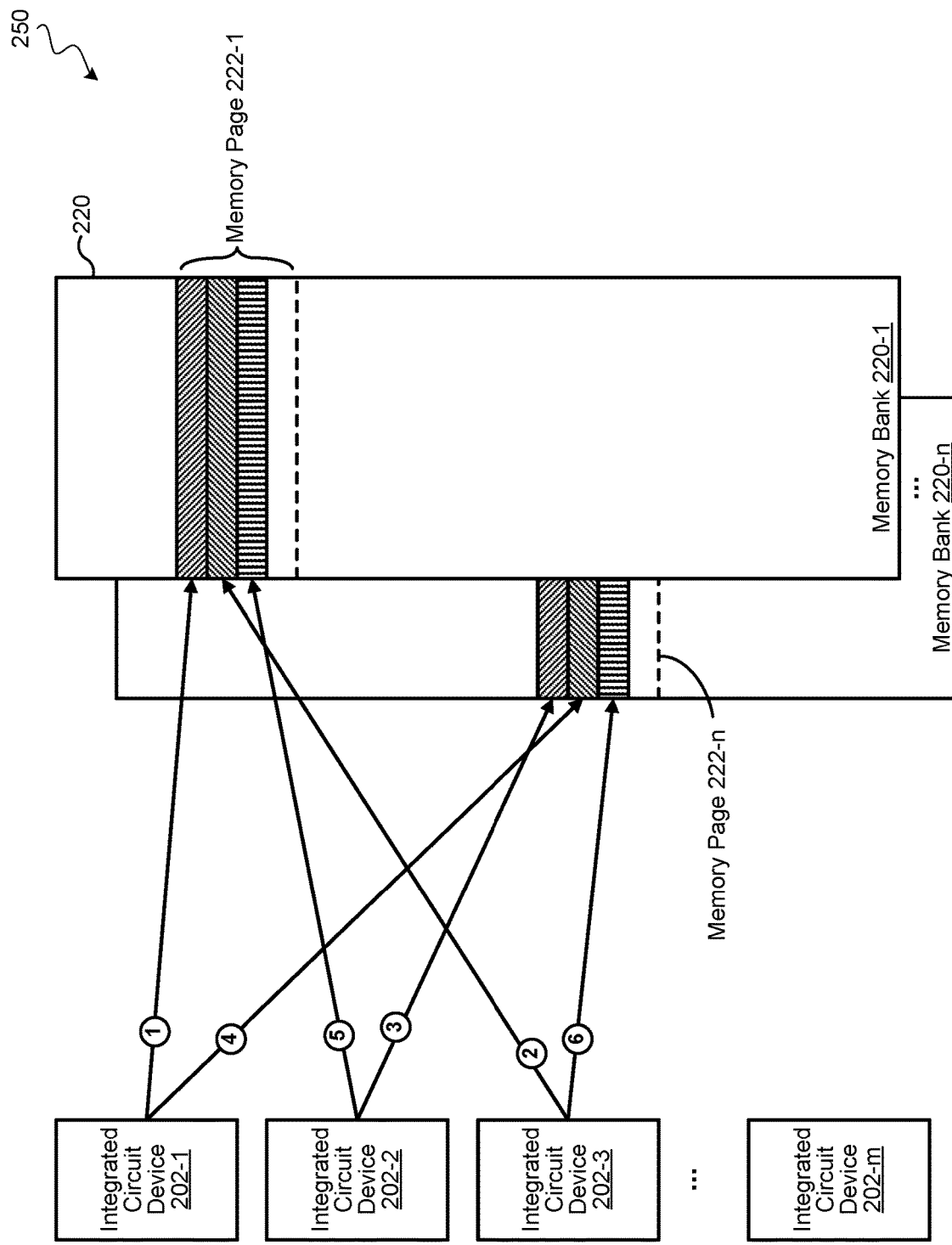
FIG. 2B illustrates a block diagram of an example of a computing system accessing multiple memory banks.

FIG. 2B illustrates an example of a computing system 250 that uses a memory access sequence to avoid page collision when accessing multiple memory banks. The components of computing system 250 can be similar to those of computing system 200, and hence a detailed description of which need not be repeated.

As shown in FIG. 2B, a memory access sequence may involve integrated circuit device 202-1 performing a first write operation to memory page 222-1 of memory bank 220-1, followed by integrated circuit device 202-3 performing a second write operation to memory page 222-1 of memory bank 220-1. Integrated circuit device 202-2 then performs a third write operation to memory page 222-n of memory bank 220-n. Next, integrated circuit device 202-1 performs a fourth write operation to memory page 222-n of memory bank 220-n. Integrated circuit device 202-2 performs a fifth write operation to memory page 222-1 of memory bank 220-1, followed by integrated circuit device 202-3 performing a sixth write operation to memory page 222-n of memory bank 220-n.

Although two different memory pages 222-1 and 222-n are being accessed by integrated circuit devices 202-1 to 202-3, the two memory pages 222-1 and 222-n belong to different memory banks 220-1 and 220-n, respectively. As such, both memory pages 222-1 and 222-n can remain open, and because the sequential write operations being performed to each bank are performed using sequential addresses directed to the same bank, the access latencies associated with closing a memory page can be eliminated. Once opened by the first write operation, memory page 222-1 can remain open for the subsequent write operations being written to memory bank 220-1, and once opened by the third write operation, memory page 220-n can remain open for the subsequent write operations to memory bank 220-n. In this manner, the overall latency of the memory accesses to multiple memory regions can be reduced, and the overall throughput can be increased. To implement such a memory access sequence to avoid page collision, each of the integrated circuit devices writing to the multiple memory regions may need information as to how the memory regions are being written by the integrated circuit devices.

Figure 3:
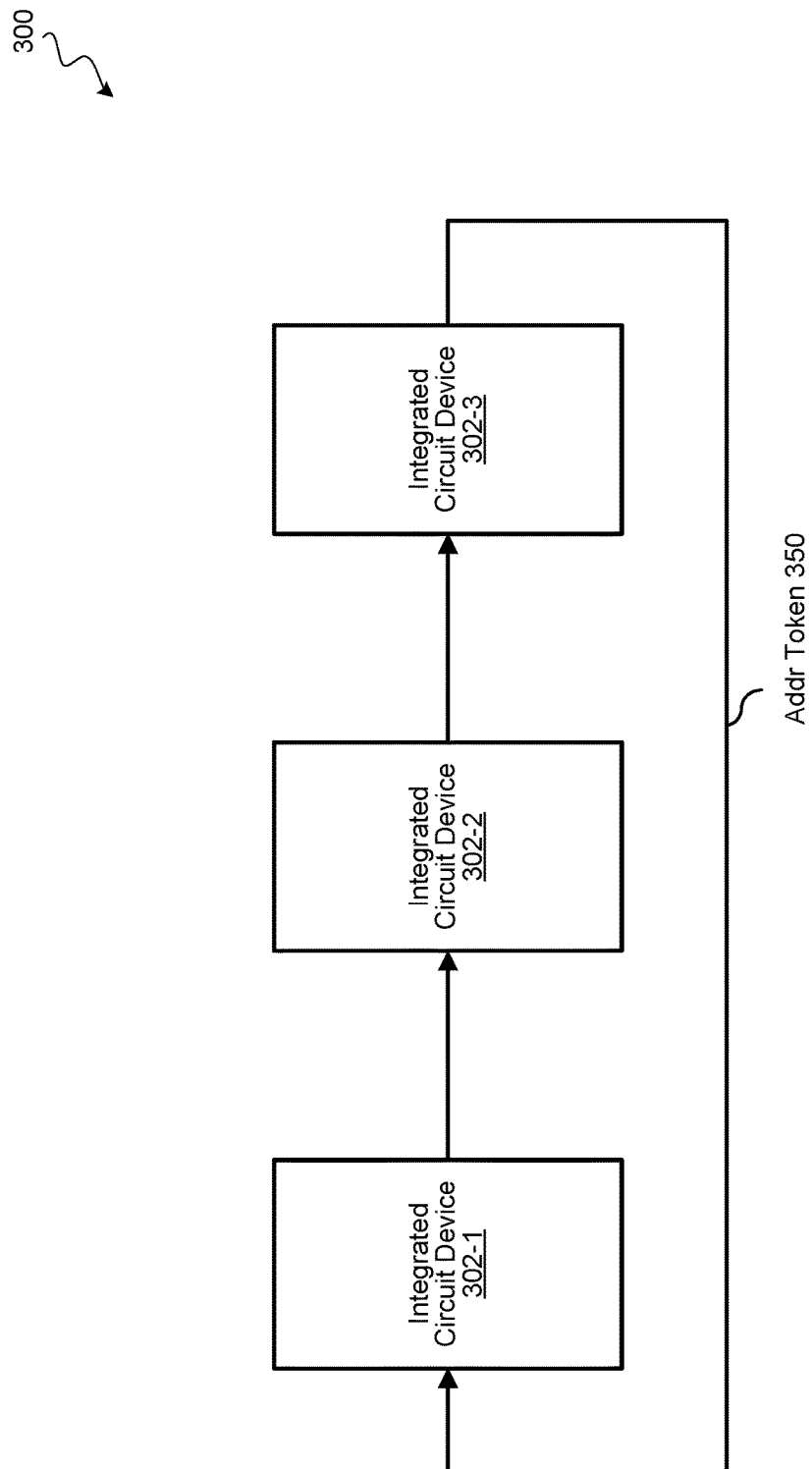
FIG. 3 illustrates an example of a computing system utilizing a communication scheme to avoid page collision.

FIG. 3 illustrates an example of a computing system 300 utilizing a communication scheme that can be used to avoid page collision. Computing system 300 may include multiple integrated circuit devices 302-1 to 302-3. Each of integrated circuit devices 302-1 to 302-3 may include memory access circuitry that is operable to access a memory device such as HBM to read data from the memory device and to write data to the memory device. Such memory access circuitry may include logic to generate interface signals to issue read and write operations to the memory device. Integrated circuit devices 302-1 to 302-3 may include, for example, DMA engines and/or other components or functional blocks described herein that can access a memory device. Each of integrated circuit devices 302-1 to 302-3 may also include address generation circuitry that is operable to perform operations to receive an address token that is used to determine a memory address to use, update the address token, and transit the address token to another integrated circuit device. Integrated circuit devices 302-1 to 302-3 may be of the same type of integrated circuit device, or include different types of integrated circuited devices such as DMA engines, processors, peripheral devices, or other components that have access to the memory device of a system.

For example, integrated circuit devices 302-1 to 302-3 can be communicatively coupled in a ring topology as shown. An address token 350 is passed along the ring topology to update each integrated circuit device with information as to which memory address should be used. For instance, integrated circuit device 302-1 may initiate the process by sending address token 350 to integrated circuit device 302-2. The address token 350 may include information indicating whether integrated circuit device 302-1 has any data to write to the memory device, or whether integrated circuit device 302-1 has written any data to the memory device during this write cycle. Upon receiving the address token 350 from integrated circuit device 302-1, integrated circuit device 302-2 can determine a sequential address to use for its own write operation.

Similarly, integrated circuit device 302-2 can update the address token 350 with information indicating whether integrated circuit device 302-2 has any data to write to the memory device, or whether integrated circuit device 302-1 has written any data to the memory device during this write cycle. Integrated circuit device 302-2 can then forward the updated address token 350 to integrated circuit device 302-3. Upon receiving the address token 350 from integrated circuit device 302-2, integrated circuit device 302-3 can determine a sequential address to use to for its own write operation. Integrated circuit device 302-3 can then update the address token 350 with information indicating whether integrated circuit device 302-3 has any data to write to the memory device, or whether integrated circuit device 302-3 has written any data to the memory device during this write cycle, and forward the update address token 350 to integrated circuit device 302-1 to start the next write cycle.

It should be understood that although system 300 is shown with three integrated circuit devices 302-1 to 302-3, the page collision prevention technique can be extended to systems having a different number of integrated circuit devices that access a common memory device. For example, in some implementations, system 300 may include thirty-two integrated circuit devices that are communicatively coupled in a ring topology.

In some implementations, memory accesses for access streams of support tasks such as notification queues can be manipulated to used sequential addresses to reduce the likelihood of page collisions, while data streams used for computational data can be executed without modifying the addresses. This may be done to ensure that the memory accesses for computational data are executed in a timely manner without having to wait for an address token and/or to ensure the computational data for an operation are stored in a consistent location. In some implementations, access streams for both support tasks and computational data can be subjected to using sequential addresses.

Figure 4:
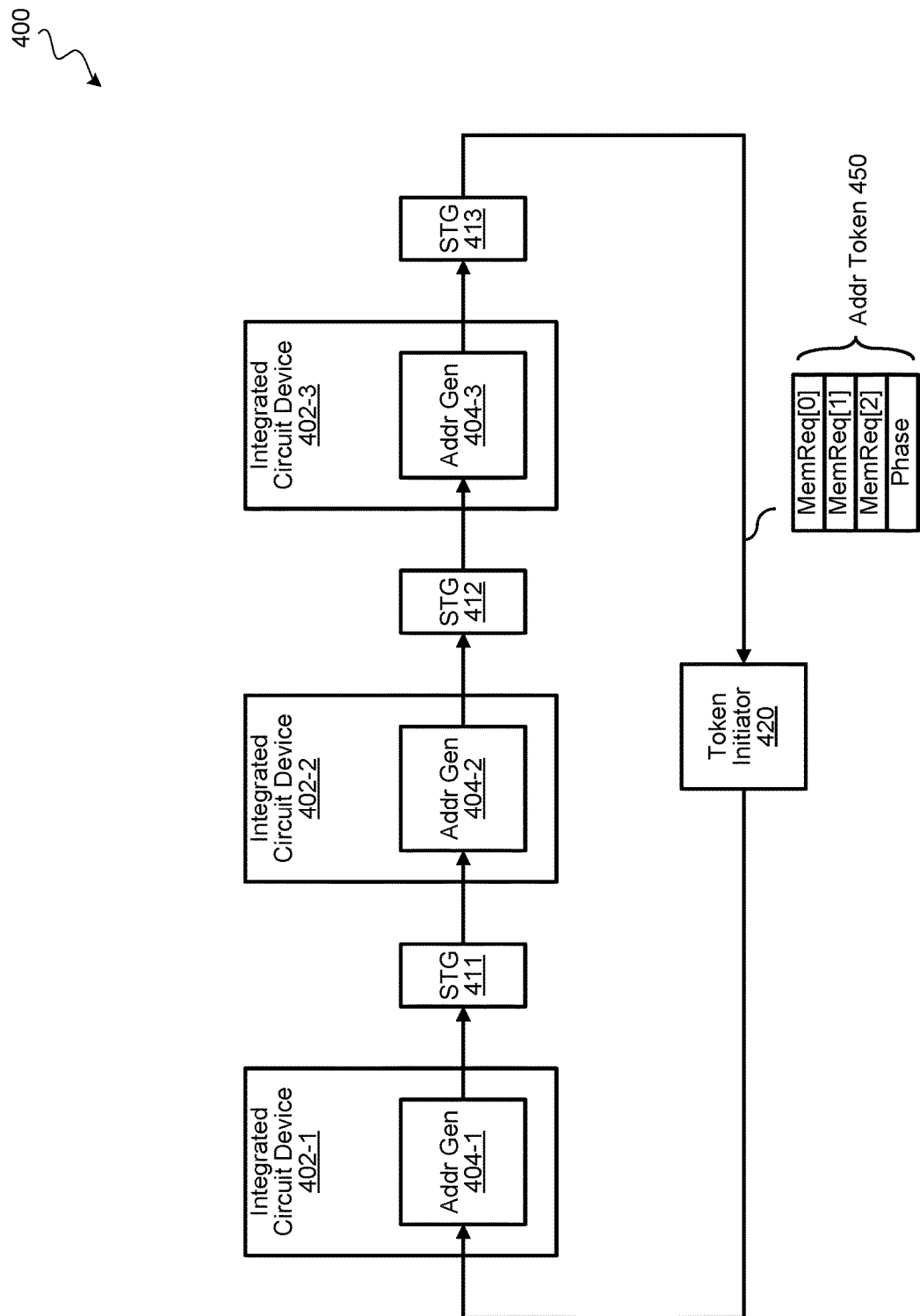
FIG. 4 illustrates another example of a computing system utilizing a communication scheme to avoid page collision.

FIG. 4 illustrates an example of a more specific implementation of a communication scheme in a computing system 400 to avoid page collision. Computing system 400 can be one example of computing system 300, and may include multiple integrated circuit devices 402-1 to 402-3 that may access a memory device such as HBM. Integrated circuit devices 402-1 to 402-3 may include, for example, DMA engines and/or other components or functional blocks described herein that can access a memory device. Integrated circuit devices 402-1 to 402-3 includes respective address generation circuits 404-1 to 404-3 communicatively coupled in a ring topology as shown with intervening timing stages 411, 412, and 413. An address token 450 is passed along the ring topology to update the address generation circuit of each integrated circuit device with information as to which memory address should be used.

The timing stages 411-413 are used for separating the clock cycles in which the address token 450 is received by each integrated circuit device. The timing stages 411-413 need not be symmetrical. In other words, a timing stage may incur more clock cycles than another timing stage. The timing delay between each integrated circuit device is immaterial to the operation of computing system 400 so long as the roundtrip delay of the address token 450 is completed within the time an integrated circuit device has to access the memory device. For example, if an integrated circuit device is expected to write 256 bytes to the memory device once every 256 clock cycles, then the roundtrip delay should be completed within 256 clock cycles to allow the integrated circuit device to write at least once every 256 clock cycles. In some implementations, if the roundtrip timing path cannot be completed within the requisite number of clock cycles (e.g., due to routing constraints or other factors), a deeper coalesce can be employed. For example, instead of writing 256 bytes once every 256 clock cycles, the integrated circuit device may write 512 bytes once every 512 clock cycles to extend the allowable roundtrip delay.

Computing system 400 may also include a token initiator 420 (may be referred to as a token initiation device) to initiate the different phases of a write cycle for computing system 400. A write cycle may refer to a cycle in which each of the integrated circuit devices communicatively coupled along the ring topology of computing system 400 has an opportunity to write to the memory device. In other words, a write cycle for computing system 400 is complete after each of integrated circuit devices 402-1 to 402-3 had an opportunity to write data to the memory device. A write cycle in computing system 400 can be implemented using a memory reservation phase and a memory access phase. During the memory reservation phase, each of integrated circuit devices 402-1 to 402-3 may update address token 450 with information indicating whether the integrated circuit device has any data to write. During the memory access phase, any of the integrated circuit devices 402-1 to 402-3 that has data to write to the memory device can perform the write operation.

Address token 450 may include a memory request bit for each of the integrated circuit devices 402-1 to 402-3 in system 400 along the ring topology. For example, address token 450 may include a memory request bit MemReq[0] for integrated circuit device 402-1, a memory request bit MemReq[1] for integrated circuit device 402-2, and a memory request bit MemReq[2] for integrated circuit device 402-3. Address token 450 may also include a phase indicator bit to indicate whether a current phase of the write cycle is the memory access phase or the memory reservation phase.

Address generation circuits 404-1 to 404-3 of respective integrated circuit devices 402-1 to 402-3 are each initialized with the same base address that points to the first available address to write in the memory device. Token initiator 420 may initiate a memory reservation phase of a write cycle by sending address token 450 that includes a memory request bit for each of integrated circuit devices 402-1 to 402-3 along the ring topology to integrated circuit device 402-1. At the start of the memory reservation phase of a write cycle, each of the memory request bits are cleared, and the phase indicator bit is set to a value representing the memory reservation phase. As address token 450 is sent along the ring topology during the memory reservation phase, each of the integrated circuit devices that has data to write to the memory device may set the memory request bit in address token 450 corresponding to the integrated circuit device.

For example, when integrated circuit device 402-1 receives address token 450, if integrated circuit devices 402-1 has data to write to the memory device in this write cycle, integrated circuit devices 402-1 may set memory request bit MemReq[0]. If integrated circuit devices 402-1 does not have data to write to the memory device in this write cycle, integrated circuit devices 402-1 may leave memory request bit MemReq[0] in the cleared state. The address token 450 is then sent along the ring topology to integrated circuit device 402-2.

Similarly, when integrated circuit device 402-2 receives address token 450 from integrated circuit device 402-1, if integrated circuit devices 402-2 has data to write to the memory device in this write cycle, integrated circuit devices 402-2 may set memory request bit MemReq[1]. If integrated circuit devices 402-2 does not have data to write to the memory device in this write cycle, integrated circuit devices 402-2 may leave memory request bit MemReq[1] in the cleared state. The address token 450 is then sent along the ring topology to integrated circuit device 402-2.

In a similar manner, when integrated circuit device 402-3 receives address token 450 from integrated circuit device 402-2, if integrated circuit devices 402-3 has data to write to the memory device in this write cycle, integrated circuit devices 402-3 may set memory request bit MemReq[2]. If integrated circuit devices 402-3 does not have data to write to the memory device in this write cycle, integrated circuit devices 402-3 may leave memory request bit MemReq[2] in the cleared state. The address token 450 is then sent along the ring topology back to token initiator 420.

When token initiator 420 receives address token 450 with the phase indicator bit indicating a memory reservation phase, the memory request bits MemReq[0:2] will reflect the number of integrated circuit devices that have pending data to write in this write cycle. In this implementation, it is assumed that each integrated circuit devices writes the same amount of data per write operation (e.g., 256 bytes). Hence, the number of memory request bits that have been set when token initiator 420 receives address token 450 represents the total amount of data for pending write operations in the current write cycle. Token initiator 420 then initiates a memory access phase by toggling the phase indicator bit in address token 450 to indicate a memory access phase, and sending address token 450 with the memory request bits as modified from the memory reservation phase together with the toggled phase indicator bit along the ring topology.

When integrated circuit device 402-1 receives the modified address token 450 with the phase indicator bit indicating a memory access phase, integrated circuit device 402-1 may perform a write operation if integrated circuit device 402-1 has data to write to the memory device as indicated by MemReq[0]. To perform the write operation, address generation circuit 404-1 generates a sequential address by adding an address offset to the base address that address generation circuit 404-1 was initialized with. The address offset is determined by the number of memory request bits that have been set for those of the memory request bits corresponding to the integrated circuit devices along the ring topology between token initiator 420 and integrated circuit device 402-1. Since there are no integrated circuit devices between token initiator 420 and integrated circuit device 402-1, the address offset is zero, and integrated circuit device 402-1 can perform its write operation using the base address. Address generation circuit 404-1 then updates the base address by incrementing the base address by a base address offset computed based on a total number of memory request bits that are set in address token 450. As mentioned above, the total number of memory request bits that are set in address token 450 represents the total amount of data being written during the current write cycle by all integrated circuit devices 402-1 to 402-3. Hence, the base address is updated accordingly to reflect the next available sequential address for the next write cycle. Integrated circuit device 402-1 then sends address token to integrated circuit device 402-2.

When integrated circuit device 402-2 receives address token 450 from integrated circuit device 402-1 with the phase indicator bit indicating a memory access phase, integrated circuit device 402-2 may perform a write operation if integrated circuit device 402-2 has data to write to the memory device as indicated by MemReq[1]. To perform the write operation, address generation circuit 404-2 generates a sequential address by adding an address offset to the base address that address generation circuit 404-2 was initialized with. The address offset is determined by the number of memory request bits that have been set for those of the memory request bits corresponding to the integrated circuit devices along the ring topology between token initiator 420 and integrated circuit device 402-2. If MemReq[0] is set in address token 450 indicating that integrated circuit device 402-1 has written data during this write cycle, an address offset representing the amount of data (e.g., 256 bytes) written by integrated circuit device 402-1 is added to the base address that address generation circuit 404-2 was initialized with to generate the sequent address for integrated circuit device 402-2. Integrated circuit device 402-2 can then perform its memory write operation using the generated sequential address. Address generation circuit 404-2 then updates its base address by incrementing the base address by a base address offset computed based on a total number of memory request bits that are set in address token 450, which represents the total amount of data being written during the current write cycle by all integrated circuit devices 402-1 to 402-3. Integrated circuit device 402-2 then sends address token to integrated circuit device 402-3.

When integrated circuit device 402-3 receives address token 450 from integrated circuit device 402-2 with the phase indicator bit indicating a memory access phase, integrated circuit device 402-3 may perform a write operation if integrated circuit device 402-3 has data to write to the memory device as indicated by MemReq[2]. To perform the write operation, address generation circuit 404-3 generates a sequential address by adding an address offset to the base address that address generation circuit 404-3 was initialized with. The address offset is determined by the number of memory request bits that have been set for those of the memory request bits corresponding to the integrated circuit devices along the ring topology between token initiator 420 and integrated circuit device 402-3. For example, if both MemReq[0] and MemReq[1] are set in address token 450 indicating that integrated circuit devices 402-1 and 402-2 have both written data during this write cycle, an address offset representing the amount of data (e.g., 2×256 bytes) written by previous integrated circuit devices in the ring topology is added to the base address that address generation circuit 404-3 was initialized with to generate the sequent address for integrated circuit device 402-3. Integrated circuit device 402-3 can then perform its memory write operation using the generated sequential address. Address generation circuit 404-3 then updates its base address by incrementing the base address by a base address offset computed based on a total number of memory request bits that are set in address token 450, which represents the total amount of data being written during the current write cycle by all integrated circuit devices 402-1 to 402-3. Integrated circuit device 402-3 then sends address token back to token initiator 420, which completes the current write cycle.

At the end of the current write cycle, the base address maintained at each of address generation circuits 404-1 to 404-3 would have been updated with the total amount of data written during the current write cycle. When token initiator 420 receives address token with the phase indicator bit indicating a memory access phase, this indicates the current write cycle has complete, and token initiator 420 can initiate the next memory reservation phase. Token initiator 420 may clear all of the memory request bits in address token 450, toggle the phase indicator bit such that the phase indicator bit indicates a memory reservation phase, and send address token having all of the memory request bits cleared with the toggled phase indicator bit along the ring topology. The process described above is then repeated using the updated base address for the next write cycle.

In some implementations, token initiator 420 can also initiate the next memory reservation phase as soon as the next clock cycle following transmission of an address token for the memory access phase. In other words, there can be multiple address tokens in transit in the ring topology at any point in time. This provides more opportunity for each integrated circuit device to write data without having to wait for the round-trip latency of the address token traversing along the ring topology.

Figure 5:
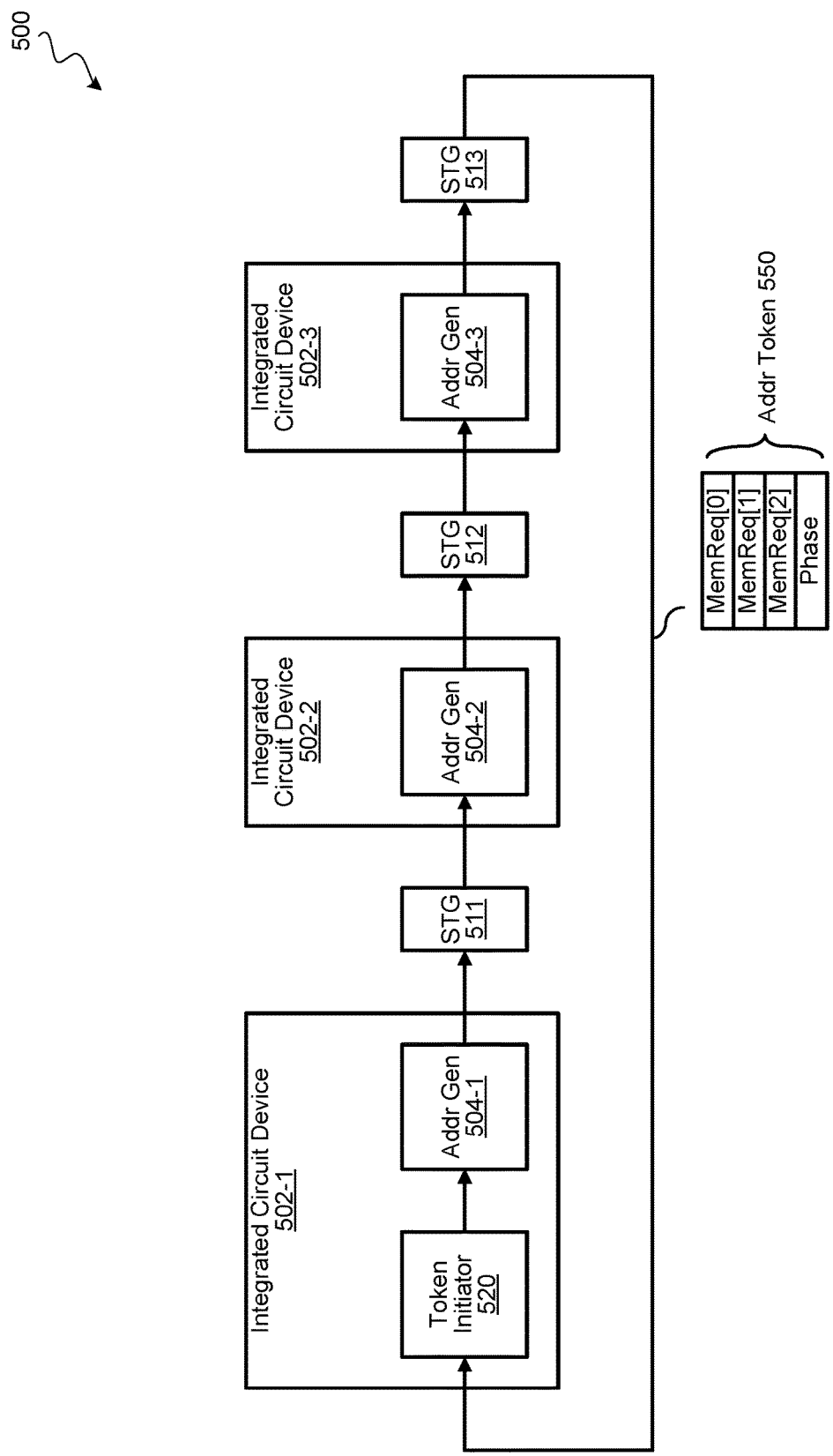
FIG. 5 illustrates a variation of a computing system utilizing a communication scheme to avoid page collision.

FIG. 5 illustrates another example of a computing system 500. Computing system 500 includes integrated circuit devices 502-1 to 502-3 that are communicatively coupled along a ring topology with intervening timing stages 511 to 513. Similar to computing system 400, computing system uses an address token 550 that includes a bit map containing a memory request bit corresponding to each of integrated circuit devices 502-1 to 502-3, and a phase indicator bit to indicate whether a current phase is a memory reservation phase or a memory access phase of the write cycle. The components of computing system 500 are similar to those of computing system 400 described above, and thus a detailed description of which need not be repeated.

Computing system 500 differs from computing system 400 in that token imitator 520 is integrated with integrated circuit device 502-1. In other words, the logic and functionality of token initiator 520 are provided by integrated circuit devices 502-1 in computing system 500. In some implementations in which integrated circuit devices 502-1 to 502-3 are all of the same type of device (e.g., all are DMA engines), each of integrated circuit devices 502-1 to 502-3 may include logic to implement token initiator 520. In such implementations, one of the integrated circuit devices 502-1 to 502-3 can be configured to perform the function of token initiate 520, while the token initiator logic in the other the integrated circuit devices 502-1 to 502-3 can be disabled such that the address token bypasses such logic when being transferred along the ring topology.

Although three integrated circuit devices are shown along the ring topology, it should also be understood that computing systems 400 and/or 500 can be extended to support a different number of integrated circuit devices that access a common memory device. For example, computing systems 400 and/or 500 can be extended to support thirty-two integrated circuit devices communicatively coupled along the ring topology. In such implementations, the address token may include thirty-two memory request bits, with each memory request bit representing one of the integrated circuit devices.

In some implementations, the address token used in computing systems 400 and/or 500 can also be extended to cover multiple memory regions. For example, different memory regions in the memory can be allocated for different notification queues. The address token may include a set of memory request bits for each notification queue. For instance, if there are four notification queues that each of the thirty-two integrated circuit devices can write to, then the address token may include 4×32 memory request bits. Each of the integrated circuit devices will maintain a separate base address corresponding to the memory region for each of the four notification queues, and the base addresses will be updated independently for each notification queue depending on which notification queue is written during each write cycle.

Figure 6:
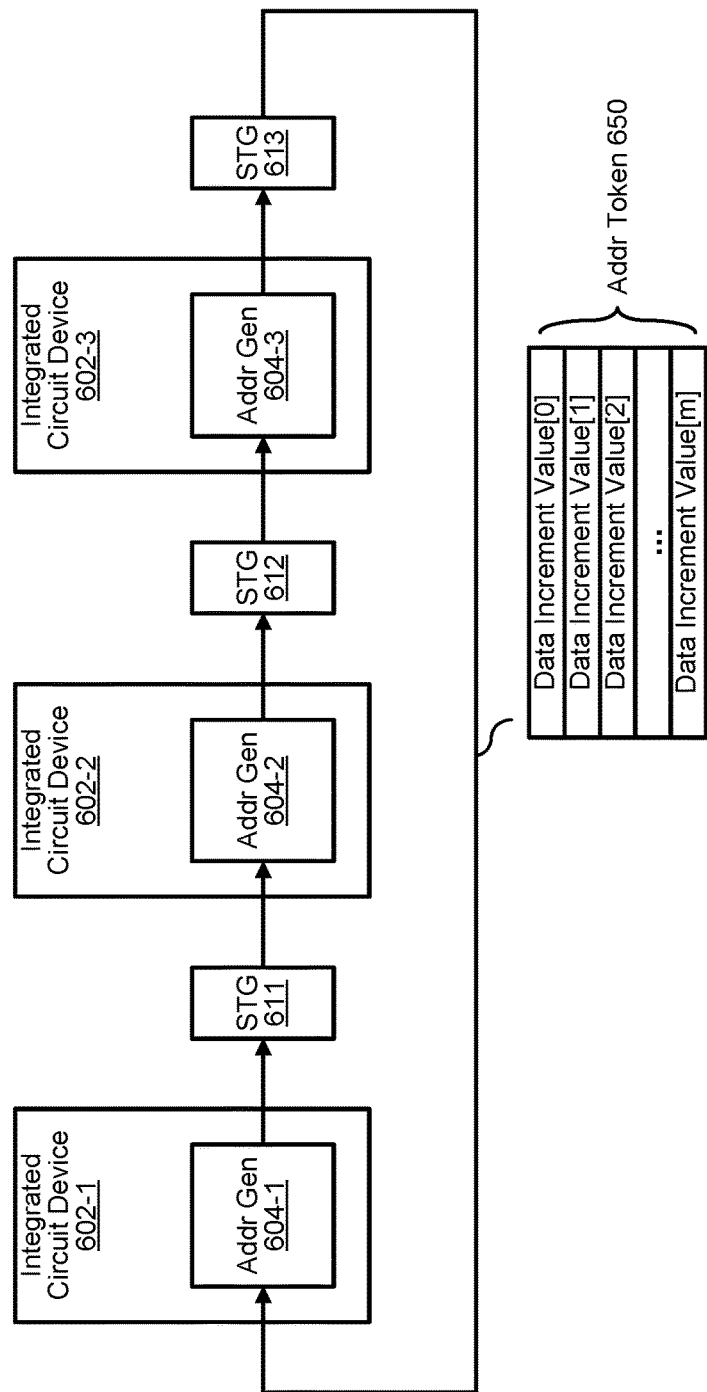
FIG. 6 illustrates a further example of a computing system utilizing a communication scheme to avoid page collision.

FIG. 6 illustrates another example of a computing system 600 that uses a different type of address token to implement the page collision prevention techniques. Computing system 600 can be another example of computing system 300. In contrast to computing system 400 and 500, the amount of data written by each integrated circuit device during a write cycle can vary between the integrated circuit devices, as well as vary between different write cycles. The address token used in computing system 600 can also be used to generate sequential addresses for multiple memory regions to support, for example, independent notification queues. Furthermore, computing system 600 does not use a token initiator.

Computing system 600 includes integrated circuit devices 602-1 to 602-3 communicatively coupled in a ring topology with intervening timing stages 611 to 613. An address token 650 that includes a data increment value for each memory region of multiple memory regions that integrated circuit devices 602-1 to 602-3 writes to is transferred along the ring topology. By way of example, integrated circuit devices 602-1 to 602-3 may write to m+1 different memory regions in the memory. As such, address token 650 may include data increment value [0] to data increment value [m] in which each data increment value corresponds to a memory region.

Each of integrated circuit devices 602-1 to 602-3 may store and maintain a set of base addresses, with each base address corresponding to a memory region. The base address for a particular memory region is initialized to the same value in each of integrated circuit devices 602-1 to 602-3. The base address is used to indicating the next available address in the corresponding memory region after writing the number of data units in the previous write cycle. Each of integrated circuit devices 602-1 to 602-3 may also store and maintain a set of values representing a number of data units written to each memory region in a previous write cycle. Hence, each of integrated circuit devices 602-1 to 602-3 may store m+1 base addresses and m+1 values representing the number of data units written to corresponding memory regions in a previous write cycle. The data increment value for that memory region in address token 650 together with the base address of a memory region and the number of data units written to that memory region in a previous write cycle stored in the integrated circuit device are used to compute a memory write address for the integrated circuit device to use for writing to that memory region.

Any of the integrated circuit devices can start the process by sending the initial address token 650 to the next integrated circuit device along the ring topology. For example, integrated circuit device 602-3 may initiate the process by initializing address token 650 with zeros for the data increment values, and sending address token 650 to integrated circuit device 602-1. As mentioned above, integrated circuit device 602-1 tracks, for each memory region, a number of data units of a previous write cycle written by the integrated circuit device integrated circuit device 602-1 to the corresponding memory region, and a base address indicating the next available address in the corresponding memory region after writing the number of data units of the previous write cycle. Since this is the first write cycle, the base address of a memory region will be the initialized based address for that memory region, and the number of data units written in the previous write cycle is zero.

When integrated circuit device 602-1 receives address token 650 from the previous integrated circuit device 602-3 along the ring topology, integrated circuit device 602-1 determines, for each memory region, a memory write address based on the data increment value of the corresponding memory region in address token 650, the base address for the corresponding memory region, and the number of data units of the previous write cycle written by integrated circuit device 602-1 to the corresponding memory region. The memory write address for a memory region is determined, for example, by adding a memory write address offset to the base address, in which the memory write address offset represents a difference between the data increment value and the number of data units written to the memory region in the previous write cycle by integrated circuit device 602-1. Integrated circuit device 602-1 also updates, for each memory region, the base address with a result of incrementing the memory write address with a base address offset representing the number of data units to write in the current write cycle.

Integrated circuit device 602-1 also modifies, for each memory region, the data increment value in address token 650 by adding, to the data increment value, a difference between the number of data units of the current write cycle to write by integrated circuit device 602-1 and the number of data units of the previous write cycle written by integrated circuit device 602-1. The updated address token is then transmitted to the next integrated circuit device 602-2 along the ring topology. If integrated circuit device 602-1 has data to write to any of the memory regions (e.g., the number of data units to write in the current write cycle to the memory region is greater than zero), integrated circuit device 602-1 can perform the write operation using the memory write address determined for the corresponding memory region. If integrated circuit device 602-1 does not have any data to write to a memory region (e.g., the number of data units to write in the current write cycle to the memory region is zero), integrated circuit device 602-1 can transmit the updated address token without writing to those specific memory regions. Integrated circuit device 602-1 also replaces, for each memory region, the number of data units written in the previous write cycle with the number of data units written in the current write cycle to prepare for the next write cycle. When integrated circuit device 602-2 receives address token 650 updated by integrated circuit device 602-1, integrated circuit device 602-2 performs a similar process to determine write memory addresses, write any data to the memory regions that integrated circuit device 602-2 has data to write to, update the base addresses and number of data units written in previous write cycle, update the data increment values in address token 650, and transmit the updated address token 650 to integrated circuit device 602-3.

The computations and updates perform for each memory region can be expressed as:

For each memory_region[i]:

$$\text{write\_memory\_address}[i] = \text{base\_address}[i] + \text{data\_increment\_value\_in}[i] - \text{num\_of\_data\_units\_written\_in\_previous\_cycle}[i];$$

$$\text{base\_address}[i] = \text{write\_memory\_address}[i] + \text{num\_of\_data\_units\_written\_in\_current\_cycle}[i];$$

$$\text{data\_increment\_value\_out}[i] = \text{data\_increment\_value\_in}[i] + \text{num\_of\_data\_units\_written\_in\_current\_cycle}[i] - \text{num\_of\_data\_units\_written\_in\_previous\_cycle}[i].$$

By way of example, the table below shows an example of how the various values maintained by the integrated circuit devices, and the data increment value in the address token are updated over three write cycles for one memory region. Each data unit referred to in the example below is one byte, and the memory addresses are byte addressable (e.g., each address addresses one byte). In the example below, four integrated circuit devices are communicatively coupled in a ring topology. The base address for this particular memory region is initialized to 1000.

| IC Device # | Base Address | Memory Write Address | Number of Data Units Written in Previous Write Cycle | Number of Data Units to Write in Current Write Cycle | Data Increment Value In | Data Increment Value Out |
|---|---|---|---|---|---|---|
| Write Cycle 1: | | | | | | |
| IC0 | 1000 | 1000 | 0 | 2 | 0 | 2 |
| IC1 | 1000 | 1002 | 0 | 4 | 2 | 6 |
| IC2 | 1000 | 1006 | 0 | 4 | 6 | 10 |
| IC3 | 1000 | 1010 | 0 | 8 | 10 | 18 |
| Write Cycle 2: | | | | | | |
| IC0 | 1002 | 1018 | 2 | 6 | 18 | 22 |
| IC1 | 1006 | 1024 | 4 | 2 | 22 | 20 |
| IC2 | 1010 | 1026 | 4 | 8 | 20 | 24 |
| IC3 | 1018 | 1034 | 8 | 4 | 24 | 20 |
| Write Cycle 3: | | | | | | |
| IC0 | 1024 | 1038 | 6 | 4 | 20 | 18 |
| IC1 | 1026 | 1042 | 2 | 2 | 18 | 18 |
| IC2 | 1034 | 1044 | 8 | 0 | 18 | 10 |
| IC3 | 1038 | 1044 | 4 | 8 | 10 | 14 |

Figure 7:
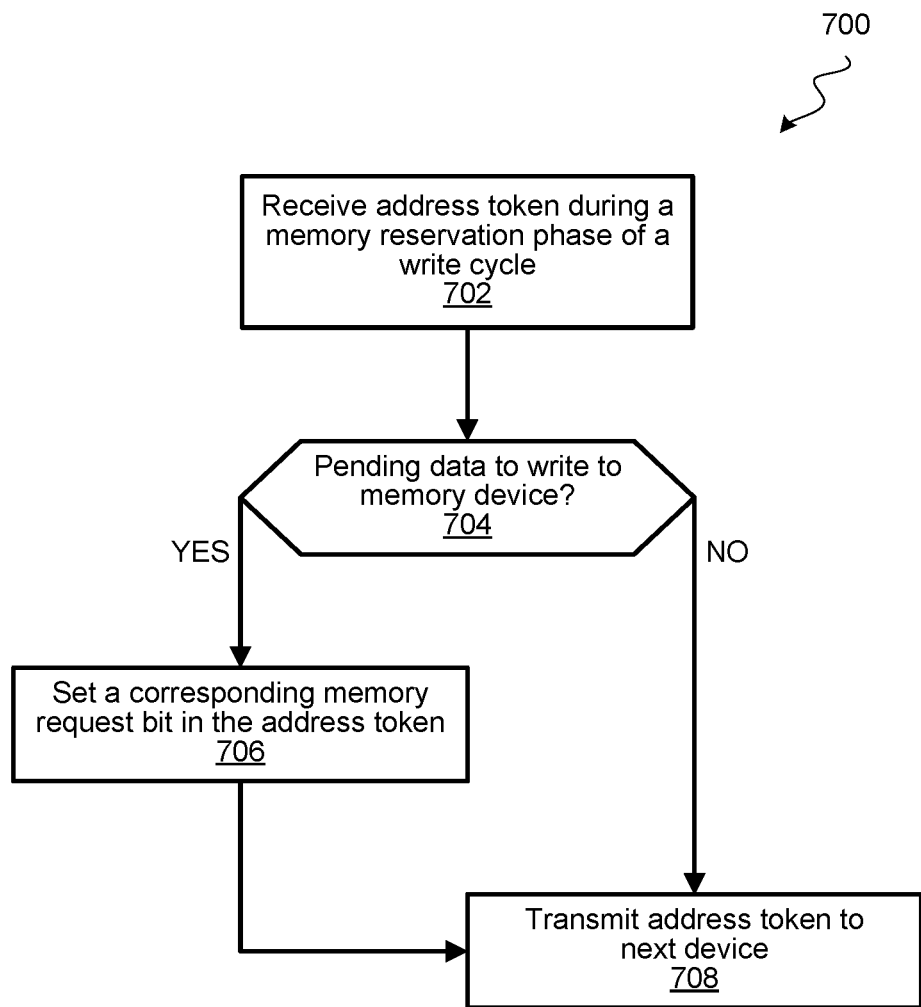
FIG. 7 illustrates a flow diagram of an example of a process for processing an address token during a memory reservation phase.

FIG. 7 illustrates a flow diagram of an example of a process 700 for processing an address token during a memory reservation phase. Process 700 can be performed, for example, by address generation circuitry in an integrated circuit device (e.g., a DMA engine, or other devices that access memory) of a computing system such as computing system 300, 400, or 500. For instance, the integrated circuit device performing process 700 can be communicatively coupled with other integrated circuit devices in a ring topology to allow an address token to be transmitted from one integrated circuit device to the next in a cyclical manner.

At block 702, an address token is received by the integrated circuit device during a memory reservation phase. The memory reservation phase can be indicated by a phase indicator bit in the address token. In some implementations, a token initiation device may initiate the memory reservation phase by initiating the transmission of the address token on the ring topology. The address token may include information indicating memory accesses for the integrated circuit devices of the computing system. For example, the address token may include a bit map containing a memory request bit for each of the integrated circuit devices communicatively coupled along the ring topology to indicate whether each integrated circuit device has data to write in the current write cycle. The token initiation device may clear the memory request bits in the address token to initiate the memory reservation phase.

At block 704, a determination is made as to whether the integrated circuit device has pending data to write to the memory device. For example, the integrated circuit device may have notification data to write to the memory device. If it is determined that the integrated circuit device has pending data to write to the memory device, then at block 706, the corresponding memory request bit for the integrated circuit device is set, and the modified address token is transmitted to the next integrated circuit device at block 708. If it is determined that the integrated circuit device does not have pending data to write to the memory device in the current write cycle, the address token is transmitted to the next integrated circuit device at block 708 without modification.

Figure 8:
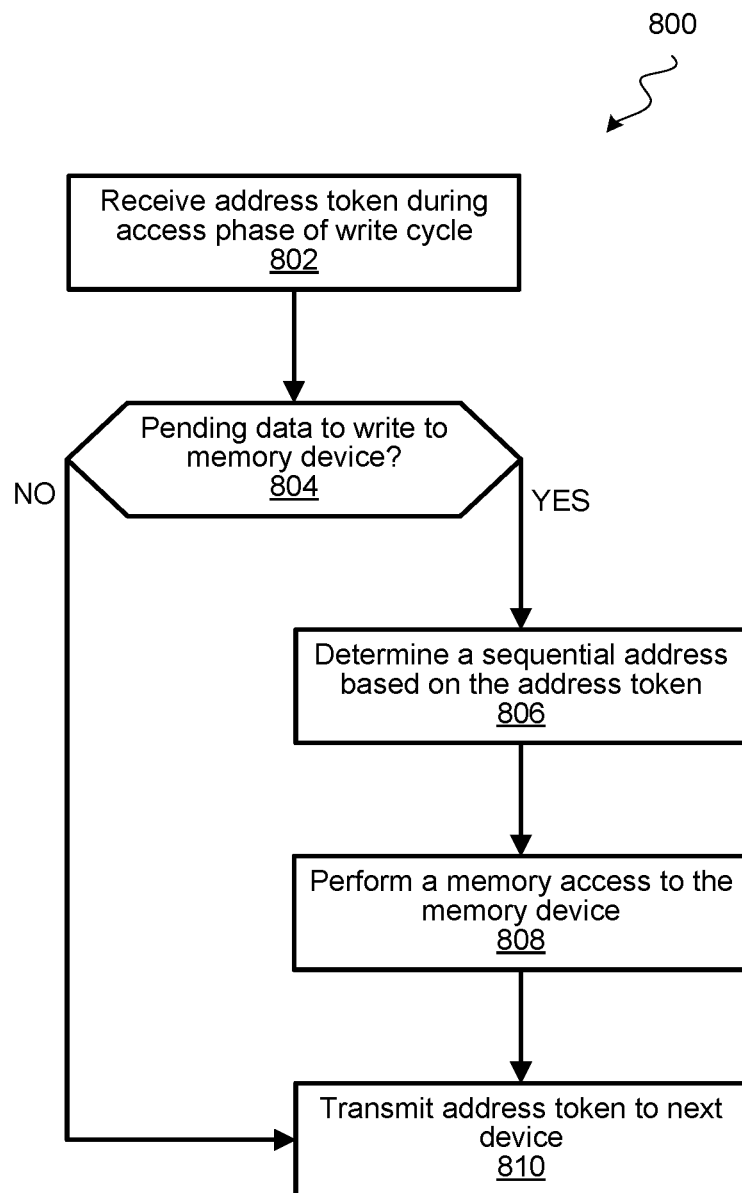
FIG. 8 illustrates a flow diagram of an example of a process for processing an address token during a memory access phase.

FIG. 8 illustrates a flow diagram of an example of a process 800 for processing an address token to generate a sequential address during a memory access phase. Process 800 can be performed, for example, by address generation circuitry in an integrated circuit device (e.g., a DMA engine, or other devices that access memory) of a computing system such as computing system 300, 400, or 500. For instance, the integrated circuit device performing process 800 can be communicatively coupled with other integrated circuit devices in a ring topology to allow an address token to be transmitted from one integrated circuit device to the next in a cyclical manner.

At block 802, an address token is received by the integrated circuit device during a memory access phase. The memory access phase can be differentiated from the memory reservation phase by a logic value of a phase indicator bit that is being sequentially transferred along the ring topology. In some implementations, a token initiation device may initiate the memory access phase by toggling the phase indicator bit when the token initiation device receives an address token from a prior memory reservation phase. The address token may include information indicating memory accesses for the integrated circuit devices of the computing system. For example, the address token may include a bit map containing a memory request bit for each of the integrated circuit devices communicatively coupled along the ring topology to indicate whether each integrated circuit device has data to write in the current write cycle. Integrated circuit devices that have pending data to write will have their corresponding memory request bit already set from the prior memory reservation phase.

At block 804, a determination is made as to whether the integrated circuit device has pending data to write to the memory device. In some implementations, the determination can be made by checking whether the memory request bit corresponding to the integrated circuit device has been set in the address token. If it is determined that the integrated circuit device has pending data to write to the memory device, then at block 806, a sequential address is determined based on the address token. The sequential address can be determined, for example, by determining the number of memory request bits that have been set for those of the memory request bits corresponding to the integrated circuit devices along the ring topology between the token initiation device and the integrated circuit device. The sequential address can then be generated by adding an address offset corresponding to the number of memory request bits that have been set to a base address. For instance, if the memory request bit represents a write of 256 bytes, then the address offset being added to the base address to generate the sequential address is an address offset corresponding to 256 bytes times the number of memory request bits that have been set for the integrated circuit devices along the ring topology between the token initiation device and the integrated circuit device.

At block 808, a memory access is performed to the memory device. For example, the integrated circuit device may use its memory access circuitry to perform a write operation to the memory device at the sequential address determined at block 806. At block 810, the address token received at block 802 is transmitted to the next integrated circuit device along the ring topology. Referring back to block 804, if it is determined that the integrated circuit device does not have pending data to write, process 700 proceeds to block 810 to transmit the address token received at block 802 to the next integrated circuit device along the ring topology.

The integrated circuit device may also update the base address being maintained at the integrated circuit device by incrementing the base address by a base address offset corresponding to a total number of memory request bits that are set in the address token. For instance, if the memory request bit represents a write of 256 bytes, then the base address offset being added to the base address is a base address offset corresponding to 256 bytes times the total number of memory request bits that have been set in the address token.

Figure 9:
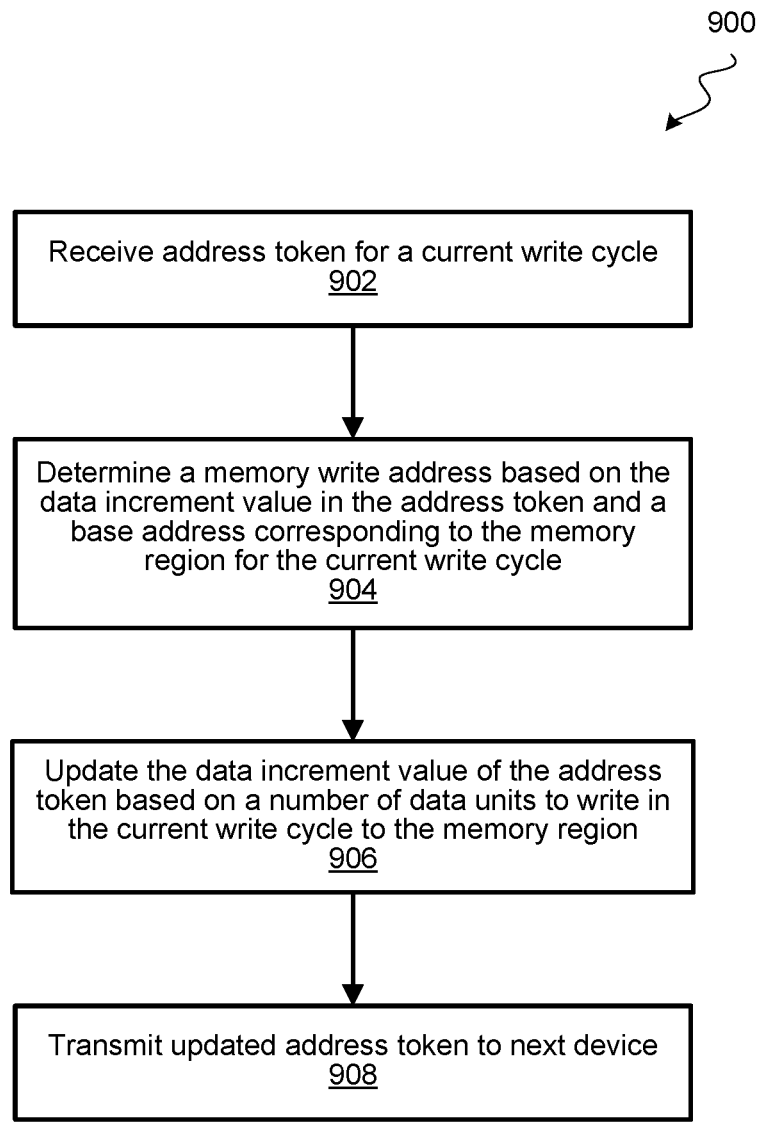
FIG. 9 illustrates a flow diagram of an example of a process for processing an address token during a write cycle.

FIG. 9 illustrates a flow diagram of an example of a process 900 for processing an address token to generate a memory write address to a memory region. Process 900 can be performed, for example, by address generation circuitry in an integrated circuit device (e.g., a DMA engine, or other devices that access memory) of a computing system such as computing system 300 or 600. For instance, the integrated circuit device performing process 900 can be communicatively coupled with other integrated circuit devices in a ring topology to allow an address token to be transmitted from one integrated circuit device to the next in a cyclical manner. To facilitate the memory write address generation process, the integrated circuit device may store and maintain a base address corresponding to the memory region, and track the number of data units (e.g., number of bytes) written to the memory region in a previous write cycle.

At block 902, an address token is received by the integrated circuit device for the current write cycle. The address token may include a data increment value for the memory region. At block 904, a memory write address is determined based on the data increment value in the address token and the base address corresponding to the memory region for the current write cycle. The memory write address can be determined, for example, by adding a memory write address offset to the base address, in which the memory write address offset represents a difference between the data increment value and a number of data units written to the memory region in the previous write cycle by the integrated circuit device.

At block 906, the data increment value of the address token for the memory region is updated based on the number of data units to write in the current write cycle to the memory region. The data increment value can be updated, for example, by adding, to the data increment value received in the address token, the difference between the number of data units to write in the current write cycle and the number of data units written to the memory region in the previous write cycle.

At block 908, the updated address token is transmitted to the next integrated circuit device along the ring topology. In addition, if the number of data units to write in the current write cycle is greater than zero, the integrated circuit device can perform a memory write operation to write the number of data units to the memory region using the memory write address determined at block 904. If the number of data units to write in the current write cycle is zero, the updated address token is transmitted to the next integrated circuit device without performing a memory write to the memory region. The base address corresponding to the memory region maintained by the integrated circuit device can also be updated with the result of incrementing the memory write address with a base address offset representing the number of data units to write to the memory region in the current write cycle.

Although the operations in process 900 has been described with reference to one memory region, the operations described in process 900 can be performed for each of multiple memory regions that the integrated circuit device may write to. For example, each memory region can be allocated for use by a notification queue. To facilitate the memory write addresses for the multiple memory regions, the integrated circuit device may store and maintain a base address for each of the memory regions. The integrated circuit device may also store and track the number of data units written to each of the memory regions in the previous write cycle. Memory writes to each memory region can be processed according to the operations of process 900.

Figure 10:
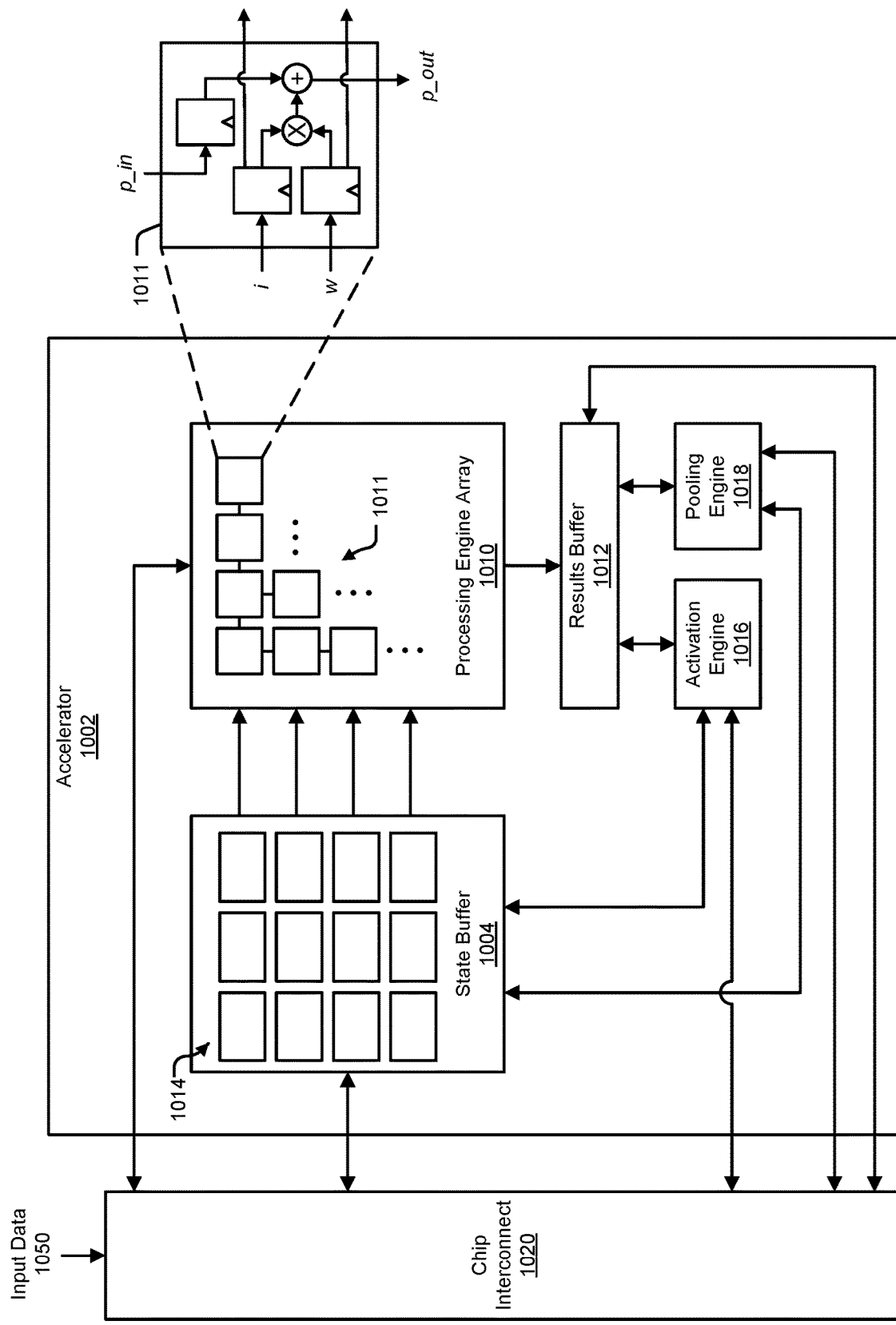
FIG. 10 illustrates a block diagram of an example of an integrated circuit device.

FIG. 10 is a block diagram illustrating an example of an integrated circuit device that can include an accelerator 1002. In various examples, the accelerator 1002, for a set of input data (e.g., input data 1050), can execute computations using a processing engine array 1010, an activation engine 1016, and/or a pooling engine 1018. In some examples, the example accelerator 1002 may be an integrated circuit component of a processor, such as a neural network processor. The processor may have other integrated circuit components, including additional accelerator engines. Accelerator 1002 may provide the data (e.g., notification messages) that are written to a memory using the techniques described above.

In various implementations, the memory subsystem 1004 can include multiple memory banks 1014. In these implementations, each memory bank 1014 can be independently accessible, meaning that the read of one memory bank is not dependent on the read of another memory bank. Similarly, writing to one memory bank does not affect or limit writing to a different memory bank. In some cases, each memory bank can be read and written at the same time.

Various techniques can be used to have independently accessible memory banks 1014. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 1004 can permit simultaneous access to the read or write channels of multiple memory banks. As another example, the memory subsystem 1004 can include arbitration logic such that arbitration between, for example, the outputs of multiple memory banks 1014 can result in more than one memory bank's output being used. In these and other examples, though globally managed by the memory subsystem 1004, each memory bank can be operated independently of any other.

Having the memory banks 1014 be independently accessible can increase the efficiency of the accelerator 1002. For example, values can be simultaneously read and provided to each row of the processing engine array 1010, so that the entire processing engine array 1010 can be in use in one clock cycle. As another example, the memory banks 1014 can be read at the same time that results computed by the processing engine array 1010 are written to the memory subsystem 1004. In contrast, a single memory may be able to service only one read or write at a time. With a single memory, multiple clock cycles can be required, for example, to read input data for each row of the processing engine array 1010 before the processing engine array 1010 can be started.

In various implementations, the memory subsystem 1004 can be configured to simultaneously service multiple clients, including the processing engine array 1010, the activation engine 1016, the pooling engine 1018, and any external clients that access the memory subsystem 1004 over a communication fabric 1020. In some implementations, being able to service multiple clients can mean that the memory subsystem 1004 has at least as many memory banks as there are clients. In some cases, each row of the processing engine array 1010 can count as a separate client. In some cases, each column of the processing engine array 1010 can output a result, such that each column can count as a separate write client. In some cases, output from the processing engine array 1010 can be written into the memory banks 1014 that can then subsequently provide input data for the processing engine array 1010. As another example, the activation engine 1016 and the pooling engine 1018 can include multiple execution channels, each of which can be separate memory clients. The memory banks 1014 can be implemented, for example, using static random access memory (SRAM).

In various implementations, the memory subsystem 1004 can include control logic. The control logic can, for example, keep track of the address spaces of each of the memory banks 1014, identify memory banks 1014 to read from or write to, and/or move data between the memory banks 1014. In some implementations, memory banks 1014 can be hardwired to particular clients. For example, a set of memory banks 1014 can be hardwired to provide values to the rows of the processing engine array 1010, with one memory bank servicing each row. As another example, a set of memory banks can be hard wired to receive values from columns of the processing engine array 1010, with one memory bank receiving data for each column.

The processing engine array 1010 is the computation matrix of the example accelerator 1002. The processing engine array 1010 can, for example, execute parallel integration, convolution, correlation, and/or matrix multiplication, among other things. The processing engine array 1010 includes multiple processing engines 1011, arranged in rows and columns, such that results output by one processing engine 1011 can be input directly into another processing engine 1011. Processing engines 1011 that are not on the outside edges of the processing engine array 1010 thus can receive data to operate on from other processing engines 1011, rather than from the memory subsystem 1004.

In various examples, the processing engine array 1010 uses systolic execution, in which data arrives at each processing engine 1011 from different directions at regular intervals. In some examples, input data can flow into the processing engine array 1010 from the left and weight values can be loaded at the top. In some examples weights and input data can flow from the left and partial sums can flow from top to bottom. In these and other examples, a multiply-and-accumulate operation moves through the processing engine array 1010 as a diagonal wave front, with data moving to the right and down across the array. Control signals can be input at the left at the same time as weights, and can flow across and down along with the computation.

In various implementations, the number of columns in the processing engine array 1010 determines the computational capacity of the processing engine array 1010, and the number of rows determines the required memory bandwidth for achieving maximum utilization of the processing engine array 1010. The processing engine array 1010 can have, for example, 64 columns and 428 rows, or some other number of columns and rows.

An example of a processing engine 1011 is illustrated in FIG. 10 in an inset diagram. As illustrated by this example, a processing engine 1011 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 1011.

In the illustrated example, an input from above can include a partial sum, p_in, provided either from another processing engine 1011 or from a previous round of computation by the processing engine array 1010. When starting a computation for a new set of input data, the top row of the processing engine array 1010 can receive a fixed value for p_in, such as zero. As illustrated by this example, i and w are multiplied together and the result is summed with p_in to produce a new partial sum, p_out, which can be input into another processing engine 1011. Various other implementations of the processing engine 1011 are possible.

Outputs from the last row in the processing engine array 1010 can be temporarily stored in the results buffer 1012. The results can be intermediate results, which can be written to the memory banks 1014 to be provided to the processing engine array 1010 for additional computation. Alternatively, the results can be final results, which, once written to the memory banks 1014 can be read from the memory subsystem 1004 over the communication fabric 1020, to be output by the system.

In some implementations, the accelerator 1002 includes an activation engine 1016. In these implementations, the activation engine 1016 can combine the results from the processing engine array 1010 into one or more output activations. For example, for a convolutional neural network, convolutions from multiple channels can be summed to produce an output activation for a single channel. In other examples, accumulating results from one or more columns in the processing engine array 1010 may be needed to produce an output activation for a single node in the neural network. In some examples, activation engine 1016 can be bypassed.

In various examples, the activation engine 1016 can include multiple separate execution channels. In these examples, the execution channels can correspond to the columns of the processing engine array 1010, and can perform an operation on the outputs of a column, the result of which can be stored in the memory subsystem 1004. In these examples, the activation engine 1016 may be able to perform between 1 and n parallel computations, where n is equal to the number of columns in the processing engine array 1010. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 1002 can include a pooling engine 1018. Pooling is the combining of outputs of the columns of the processing engine array 1010. Combining can include for example, computing a maximum value, a minimum value, an average value, a median value, a summation, a multiplication, or another logical or mathematical combination. In various examples, the pooling engine 1018 can include multiple execution channels that can operating on values from corresponding columns of the processing engine array 1010. In these examples, the pooling engine 1018 may be able to perform between 1 and n parallel computations, where n is equal to the number of columns in the processing engine array 1010. In various examples, execution channels of the pooling engine 1018 can operate in parallel and/or simultaneously. In some examples, the pooling engine 1018 can be bypassed.

Herein, the activation engine 1016 and the pooling engine 1018 may be referred to collectively as execution engines. The processing engine array 1010 is another example of an execution engine. Another example of an execution engine is a Direct Memory Access (DMA) engine, which may be located outside the accelerator 1002.

Input data 1050 can arrive over the communication fabric 1020. The communication fabric 1020 can connect the accelerator 1002 to other components of a processor, such as a DMA engine that can obtain input data 1050 from an Input/Output (I/O) device, a storage drive, or a network interface. The input data 1050 can be, for example one-dimensional data, such as a character string or numerical sequence, or two-dimensional data, such as an array of pixel values for an image or frequency and amplitude values over time for an audio signal. In some examples, the input data 1050 can be three-dimensional, as may be the case with, for example, the situational information used by a self-driving car or virtual reality data. In some implementations, the memory subsystem 1004 can include a separate buffer for the input data 1050. In some implementations, the input data 1050 can be stored in the memory banks 1014 when the accelerator 1002 receives the input data 1050.

In some examples, the accelerator 1002 can implement a neural network processing engine. In these examples, the accelerator 1002, for a set of input data 1050, can execute a neural network to perform a task for which the neural network was trained. Executing a neural network on a set of input data can be referred to as inference or performing inference.

The weights for the neural network can be stored in the memory subsystem 1004, along with input data 1050 on which the neural network will operate. The neural network can also include instructions, which can program the processing engine array 1010 to perform various computations on the weights and the input data. The instructions can also be stored in the memory subsystem 1004, in the memory banks 1014 or in a separate instruction buffer. The processing engine array 1010 can output intermediate results, which represent the outputs of individual layers of the neural network. In some cases, the activation engine 1016 and/or pooling engine 1018 may be enabled for computations called for by certain layers of the neural network. The accelerator 1002 can store the intermediate results in the memory subsystem 1004 for inputting into the processing engine array 1010 to compute results for the next layer of the neural network. The processing engine array 1010 can further output final results from a last layer of the neural network. The final results can be stored in the memory subsystem 1004 and then be copied out to host processor memory or to another location.

Figure 11:
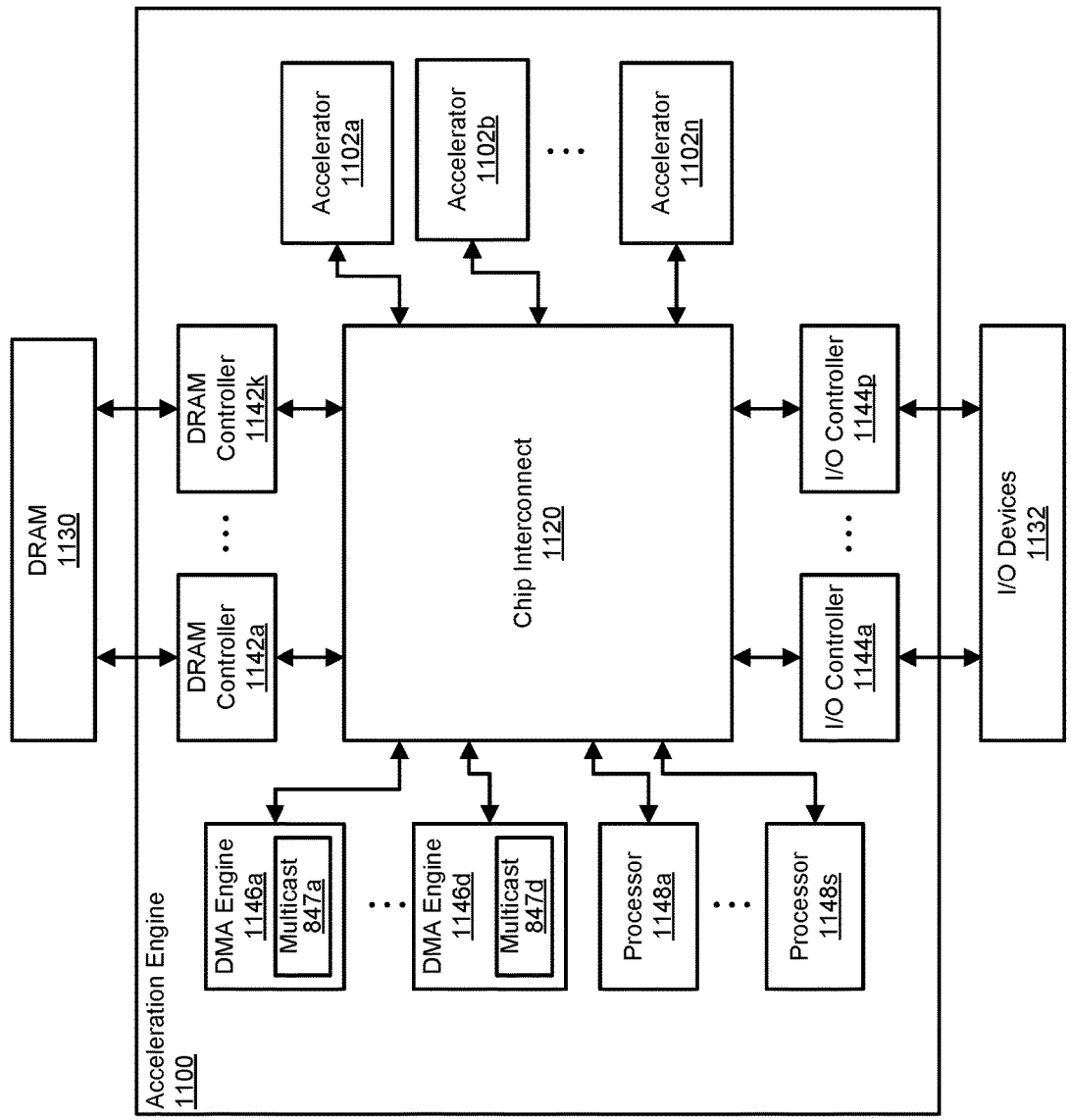
FIG. 11 illustrates a block diagram of an example of an acceleration engine.

FIG. 11 includes a block diagram that illustrates an example of an acceleration engine 1100. The acceleration engine 1100 is an example of an integrated circuit that can include one or more accelerators 1102a-1102n that may be similar to the accelerator illustrated in FIG. 10.

In the example of FIG. 11, the acceleration engine 1100 includes multiple accelerators 1102a-1102n, each of which can perform a set of operations. In various examples, the accelerators 1102a-1102n are for particular types of operations, so that the accelerators 1102a-1102n can perform the operations much faster than when similar operations are performed by a general purpose processor. In various examples, to perform a set of operations, input data on which the operations are to be performed must first be moved into the accelerators 1102a-1102n. Additionally, in some cases, program code is also moved into the accelerators 1102a-1102n, which programs the operations that the accelerators 1102a-1102n will perform on the data. In the illustrated example, the acceleration engine 1100 includes n accelerators 1102a-1102n. Examples of accelerators that can be included in the acceleration engine 1100 include graphics accelerators, floating point accelerators, neural network accelerators, and others. In various examples, the accelerators 1102a-1102n can each be the same (e.g., each of the accelerators 1102a-1102n is a graphics accelerator) or can be different (e.g., the accelerators 1102a-1102n include a graphics accelerator, a floating point accelerator, and neural network accelerator).

The example acceleration engine 1100 further includes DRAM controllers 1142a-1142k for communicating with an external memory. The external memory is implemented, in this example, using DRAM 1130. In the illustrated example, the acceleration engine 1100 includes k DRAM controllers 1142a-1142k, each of which may be able to communicate with an independent set of banks of DRAM. In other examples, other types of RAM technology can be used for the external memory. The DRAM controllers 1142a-1142k can also be referred to as memory controllers.

In various examples, input data and/or program code for the accelerators 1102a-1102n can be stored in the DRAM 1130. Different programs can cause the accelerators 1102a-1102n to perform different operations. For example, when one of the accelerators is a neural network accelerator, one program can configure the neural network accelerator to perform speech recognition while another program can configure the neural network accelerator to perform image recognition. In various examples, different accelerators 1102a-1102n can be programmed with different programs, so that each performs a different set of operations. In various examples, the processors 1148a-1148s can manage moving of program code from the DRAM 1130 to the accelerators 1102a-1102n.

The example acceleration engine 1100 further includes I/O controllers 1144a-1144p for communicating with I/O devices 1132 in the system. The acceleration engine 1100 can communicate with I/O devices over, for example, a processor bus. In some examples, the processor bus can be implemented using Peripheral Component Interconnect (PCI) and/or a variation of the PCI bus protocol. The processor bus can connect the acceleration engine 1100 to I/O devices such as, for example, input and output devices, memory controllers, storage devices, and/or network interface cards, among other things. In some examples, the I/O controllers 1144-1144p can enable the acceleration engine 1100 to act as an I/O device for a host processor. For example, the acceleration engine 1100 can be the recipient of input data from the host processor, and a command indicating an operation to be performed on the input data (e.g., a particular computation or analysis). In the illustrated example, the acceleration engine 1100 includes p I/O controllers 1144a-1144p, each of which may include a separate root complex and may communicate with a separate set of I/O devices 1132. In other examples, other standardized bus protocols, such as Ultra Path Interconnect (UPI) can be used for the host bus. In other examples, a proprietary bus protocol can be used.

Movement of data in the acceleration engine 1100 can be managed by one or more processors 1148a-1148s, which can also be referred to as data management processors. In the example of FIG. 11, the acceleration engine 1100 includes s processors 1148a-1148s incorporated into the device (e.g., on the same silicon die). In other examples, the processors 1148a-1148s can be external to the acceleration engine 1100 (e.g., on a different die and/or in a different package). In some examples, the processors 1148a-1148s can manage the movement of data from I/O devices 1132 to the accelerators 1102a-1102n or the DRAM 1130. For example, input data may be located at an I/O device 1132 or in processor memory, and the processors 1148a-1148s can move the input from the I/O device 1132 or processor memory into an accelerator or into DRAM 1130. As another example, program code for the accelerators 1102a-1102n may be located on an I/O device 1132 or in processor memory.

The example acceleration engine 1100 further includes DMA engines 1146a-1146d that can move data between the accelerators 1102a-1102n, DRAM controllers 1142a-1142k, and I/O controllers 1144a-1144p. In the illustrated example, the acceleration engine 1100 includes d DMA engines 1146a-1146d. In some implementations, the DMA engines 1146a-1146d can be assigned to specific tasks, such as moving data from the DRAM controllers 1142a-1142d to the accelerators 1102a-1102n, or moving data between the I/O controllers 1144a-1144p and the accelerators 1102a-1102n.

These tasks can be assigned, for example, by enqueueing descriptors with the DMA engines 1146a-1146d, where a descriptor identifies an address for a block of data and an operation (e.g., a read or a write) to perform. A descriptor, for example, can direct a DMA engine to instruct a DMA controller to read a block of data from DRAM 1130. A descriptor can, as a further example, instruct the DMA engine to write data, read by the DMA controller, to an accelerator. Further descriptors can be used to move data from an accelerator to DRAM 1130.

In various examples, each of the processors 1148a-1148s can be responsible for managing the data movement for a different accelerator. In some examples, a processor may manage the data movement for more than one accelerator. Similarly, in various examples, each of the processors 1148a-1148s can be assigned to one or more DMA engines 1146a-1146d. In these and other examples, associations between processors 1148a-1148s, accelerators 1102a-1102n, and DMA engines 1146a-1146d are determined by program code being executed by each respective processor.

In the example acceleration engine 1100, the various components can communicate over a chip interconnect 1120. The chip interconnect 1120 primarily includes wiring for routing data between the components of the acceleration engine 1100. In some cases, the chip interconnect 1120 can include a minimal amount of logic, such as multiplexors to control the direction of data, flip-flops for handling clock domain crossings, and timing logic.

Figure 12:
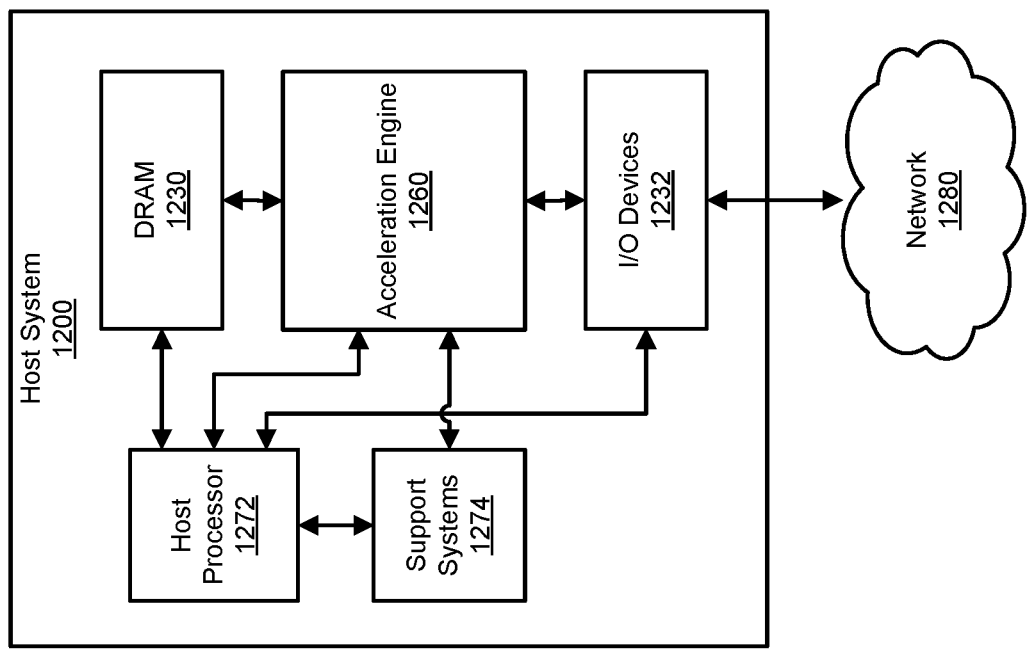
FIG. 12 illustrates a block diagram of an example of a host system.

FIG. 12 includes a block diagram that illustrates an example of a host system 1200 in which an acceleration engine 1260 can be used. The acceleration engine 1260 of FIG. 12 is an example of a device that can include one or more accelerators such as is illustrated in FIG. 11. The example host system 1200 of FIG. 12 includes the acceleration engine 1260, a host processor 1272, DRAM 1230 or processor memory, I/O devices 1232, and support systems 1274. In various implementations, the host system 1200 can include other hardware that is not illustrated here.

The host processor 1272 is a general purpose integrated circuit that is capable of executing program instructions. In some examples, the host processor 1272 can include multiple processing cores. A multi-core processor may include multiple processing units within the same processor. In some examples, the host system 1200 can include more than one host processor 1272. In some examples, the host processor 1272 and the acceleration engine 1260 can be one chip, such as, one or more integrated circuits within the same package.

In various examples, the host processor 1272 can communicate with other components in the host system 1200 over one or more communication channels. For example, the host system 1200 can include a host processor bus, which the host processor 1272 can use to communicate with the DRAM 1230, for example. As another example, the host system 1200 can include an I/O bus, such as a PCI-based bus, over which the host processor 1272 can communicate with the acceleration engine 1260 and/or the I/O devices 1232, for example. In various examples, the host system 1200 can, alternatively or additionally, include other communication channels or busses, such as serial busses, power management busses, storage device busses, and so on.

In some examples, software programs executing on the host processor 1272 can receive or generate input for processing by the acceleration engine 1260. In some examples, the programs can select an appropriate neural network to execute for a given input. For example, a program may be for language translation, and can select one or more neural networks capable of speech recognition and/or machine translation. In these and other examples, the programs can configure the acceleration engine 1260 with the neural network to execute, and/or can select a neural network processing engine on the acceleration engine 1260 that has previously been configured to execute the desired neural network. In some examples, once the acceleration engine 1260 has started an inference on input data, the host processor 1272 can manage the movement of data (such as weights, instructions, intermediate results, results of conditional layers, and/or final results) into or out of the acceleration engine 1260.

In some examples, a software program that is using the acceleration engine 1260 to conduct an inference can read the result from a conditional layer from the acceleration engine 1260 and/or from a storage location, such as in DRAM 1230. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 1230 is memory that is used by the host processor 1272 for storage of program code that the host processor 1272 is in the process of executing, as well as values that are being operated on. In some examples, the data for a neural network (e.g., weight values, instructions, and other data) can be all or partially stored in the DRAM 1230. DRAM is a common term for processor memory, and though DRAM is volatile memory, processor memory can be volatile and/or non-volatile. Though not illustrated here, the host system 1200 can include other volatile and non-volatile memories for other purposes. For example, the host system 1200 can include a Read-Only Memory (ROM) that stores boot code for booting the host system 1200 at power on, and/or Basic Input/Output System (BIOS) code.

Though not illustrated here, the DRAM 1230 can store instructions for various programs, which can be loaded into and be executed by the host processor 1272. For example, the DRAM 1230 can be storing instructions for an operating system, one or more data stores, one or more application programs, one or more drivers, and/or services for implementing the features disclosed herein.

The operating system can manage and orchestrate the overall operation of the host system 1200, such as scheduling tasks, executing applications, and/or controller peripheral devices, among other operations. In some examples, a host system 1200 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers.

Alternatively or additionally, the data stores may store standard and/or proprietary software libraries, and/or standard and/or proprietary application user interface (API)

libraries. Information stored in the data stores may be machine-readable object code, source code, interpreted code, or intermediate code.

The drivers can include programs that provide communication between components in the host system 1200. For example, some drivers can provide communication between the operating system and peripheral devices or I/O devices 1232. Alternatively or additionally, some drivers may provide communication between application programs and the operating system, and/or application programs and peripheral devices accessible to the host system 1200. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 1232 can include hardware for connecting to user input and output devices, such as keyboards, mice, pens, tablets, voice input devices, touch input devices, displays or monitors, speakers, and printers, among other devices. The I/O devices 1232 can also include storage drives and/or network interfaces for connecting to a network 1280. For example, the host system 1200 can use a network interface to communicate with storage devices, user terminals, other computing devices or servers, and/or other networks, among various examples.

In various examples, one or more of the I/O devices 1232 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 1200 or may be in an external enclosure. A storage device can be fixed (e.g., attached by screws) or removable (e.g., having a physical release mechanism and possibly a hot-plug mechanism).

Storage devices, the DRAM 1230, and any other memory component in the host system 1200 are examples of computer-readable storage media. Computer-readable storage media are physical mediums that are capable of storing data in a format that can be read by a device such as the host processor 1272. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 1232 can be PCI-based devices. In these examples, a PCI-based I/O device includes a PCI interface for communicating with the host system 1200. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 1274 can include hardware for coordinating the operations of the acceleration engine 1260. For example, the support systems 1274 can include a microprocessor that coordinates the activities of the acceleration engine 1260, including moving data around on the acceleration engine 1260. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 1272. In some examples, the program executed by the microprocessor is stored on the hardware of microprocessor, or on a non-volatile memory chip in the host system 1200. In some examples, the microprocessor and the acceleration engine 1260 can be on chip, such as one integrated circuit on the same die and in the same package.

In some examples, the support systems 1274 can be responsible for taking instructions from the host processor 1272 when programs executing on the host processor 1272 request the execution of a neural network. For example, the host processor 1272 can provide the support systems 1274 with a set of input data and a task that is to be performed on the set of input data. In this example, the support systems 1274 can identify a neural network that can perform the task, and can program the acceleration engine 1260 to execute the neural network on the set of input data. In some examples, the support systems 1274 only needs to select an appropriate neural network processing engine of the neural network processor. In some examples, the support systems 1274 may need to load the data for the neural network onto the acceleration engine 1260 before the acceleration engine 1260 can start executing the neural network. In these and other examples, the support systems 1274 can further receive the output of executing the neural network, and provide the output back to the host processor 1272.

In some examples, the operations of the support systems 1274 can be handled by the host processor 1272. In these examples, the support systems 1274 may not be needed and can be omitted from the host system 1200.

In various examples, the host system 1200 can include a combination of host systems, processor nodes, storage subsystems, and I/O chassis that represent user devices, service provider computers or third party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 1200 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method comprising:
   receiving, by an integrated circuit device in a system of integrated circuit devices communicatively coupled in a ring topology, an address token during a memory access phase, the address token indicating memory accesses for the system of integrated circuit devices and including a bit map containing a memory request bit for each of the integrated circuit devices, the address token being sequentially transferred along the ring topology;
   determining, by the integrated circuit device, a sequential address based on the address token; and
   performing, by the integrated circuit device, a memory access to a memory device using the sequential address.

2. The method of claim 1, wherein the ring topology includes a token initiation device operable to initiate transfer of the address token.

3. The method of claim 2, wherein the sequential address is determined during the memory access phase by:
   determining a number of memory request bits that have been set for memory request bits corresponding to the integrated circuit devices along the ring topology between the token initiation device and the integrated circuit device; and
   adding an address offset corresponding to the number of memory request bits that have been set to a base address to generate the sequential address.

4. The method of claim 3, further comprising:
   incrementing the base address by a base address offset corresponding to a total number of memory request bits that are set in the address token.

5. The method of claim 1, further comprising:
   receiving, by the integrated circuit device, the address token during a memory reservation phase;
   determining, by the integrated circuit device, that the integrated circuit device has data to write to the memory device; and
   setting, by the integrated circuit device, the memory request bit corresponding to the integrated circuit device.

6. The method of claim 5, wherein the memory access phase is differentiated from the memory reservation phase by a logic value of a phase indicator bit in the address token.

7. The method of claim 6, wherein the phase indicator bit is toggled by a token initiation device.

8. The method of claim 7, wherein the memory request bits in the address token are cleared by the token initiation device to initiate the memory reservation phase.

9. An integrated circuit device comprising:
   memory access circuitry operable to write data to a memory device; and
   address generation circuitry operable to:
     receive an address token during a memory access phase;
     generate a sequential address based on the address token;
     provide the sequential address to the memory access circuitry to write the data to the memory device using the sequential address; and
     transmit the address token to another integrated circuit device in a system of integrated circuit devices,
     wherein the address token has a set of memory request bits including a memory request bit corresponding to each of the integrated circuit devices in the system of integrated circuit devices.

10. The integrated circuit device of claim 9, wherein the sequential address is generated by adding an address offset to a base address, the address offset determined based on the memory request bits.

11. The integrated circuit device of claim 10, wherein the address generation circuitry is operable to update the base address after generating the sequential address by incrementing the base address by a total number of memory request bits that have been set in the address token.

12. The integrated circuit device of claim 9, wherein the address generation circuitry is operable to:
    receive the address token during a memory reservation phase;
    determine that the memory access circuitry has data to write to the memory device;
    set the memory request bit corresponding to the integrated circuit device in the address token; and
    transmit the address token to the next integrated circuit device.

13. The integrated circuit device of claim 12, wherein the address token includes a phase indicator bit to indicate whether a current phase is the memory access phase or the memory reservation phase.

14. The integrated circuit device of claim 13, wherein the memory reservation phase and the memory access phase are initiated by a token initiation device in the system of integrated circuit devices.

15. The integrated circuit device of claim 14, wherein the token initiation device initiates the memory access phase by:
    receiving the address token modified during the memory reservation phase;
    toggling the phase indicator bit; and
    sending the address token from the memory reservation phase with the toggled phase indicator bit along the system of integrated circuit devices.

16. The integrated circuit device of claim 15, wherein the token initiation device initiates a second memory reservation phase by:
    sending a second address token having all of the memory request bits cleared and the phase indicator bit indicating a memory reservation phase along the system of integrated circuit devices.

17. The integrated circuit device of claim 15, wherein the integrated circuit devices of the system are communicatively coupled in a ring topology.

18. The integrated circuit device of claim 9, wherein the system of integrated circuit devices includes a plurality of different types of integrated circuit devices including a direct memory access engine type of integrated circuit device.

* * * * *